United States Patent [19]

Takai et al.

[11] Patent Number: 5,615,104
[45] Date of Patent: Mar. 25, 1997

[54] MONITORING METHOD AND APPARATUS USING A PROGRAMMABLE LOGIC CONTROLLER

[75] Inventors: Shigeharu Takai; Hideo Shikida; Hiroki Kato; Tatsuhiro Ikeno, all of Aichi, Japan

[73] Assignee: Mitsubishi Denki Kabushiki Kaisha, Tokyo, Japan

[21] Appl. No.: 413,640

[22] Filed: Mar. 30, 1995

[30]    Foreign Application Priority Data

Mar. 31, 1994  [JP]  Japan .................................. 6-063035
Mar. 24, 1995  [JP]  Japan .................................. 7-066444

[51] Int. Cl.⁶ ............................ G05B 15/00; G05B 19/18
[52] U.S. Cl. ............................................. 364/134; 364/141
[58] Field of Search ............................ 364/134; 395/100; 358/141

[56]               References Cited
              U.S. PATENT DOCUMENTS 4,471,348  9/1984  London et al. ........................ 340/722
4,636,858  1/1987  Hague et al. ......................... 358/141
4,961,131 10/1990  Ashida ................................. 364/140
5,093,902  3/1992  Tokumitsu ........................... 395/100

FOREIGN PATENT DOCUMENTS 0141858   5/1985  European Pat. Off. ........ G05B 23/02
62-117003 5/1987  Japan ............................. G05B 19/02
63-41908  2/1988  Japan ............................. G05B 19/02
5-22314   1/1993  Japan ............................. H04L 12/40

Primary Examiner—Paul P. Gordon
Assistant Examiner—Karen D. Presley
Attorney, Agent, or Firm—Sughrue, Mion, Zinn, Macpeak & Seas

[57]               ABSTRACT

A method for monitoring the operation of a plurality of programmable devices in a system which controls the programmable devices, and corresponding apparatus for monitoring the same. The employs two CPUs. One of the CPUs is controlled to communicate with the programmable logic controller of the system, specifically, to process devices read from the PLC, and to return the result to a two-port memory. The other CPU is controlled to read the result from the two-port memory and display it on the CRT, thus enabling a monitor display, which displays the operation of the programmable device, to have a fast response time.

22 Claims, 50 Drawing Sheets

TWO-PORT MEMORY ~116

TREND REGISTRATION AREA ~117

| ELEMENT | WIDTH 400 | HEIGHT 300 | NUMBER OF POINTS 7 | NUMBER OF LINES 3 |
| PLC DEVICE | D2, | D3, | D4 | |
| CYCLE | 10 | | | |

STARTING POINT
↓
TREND AREA ~118

STARTING POINT AREA ~119

0

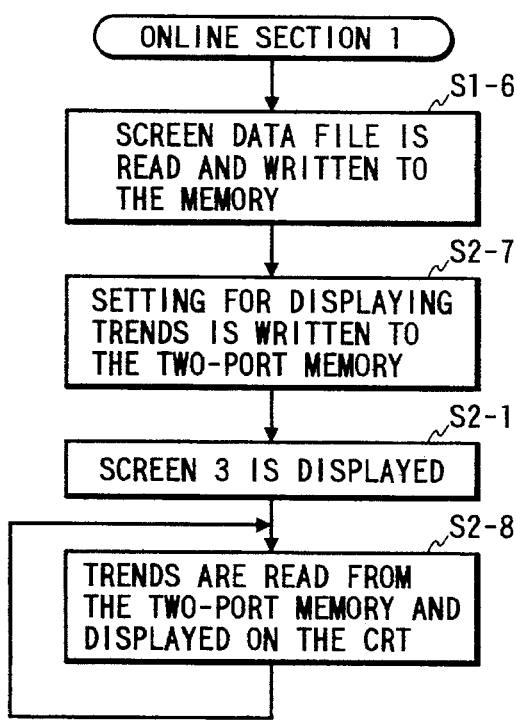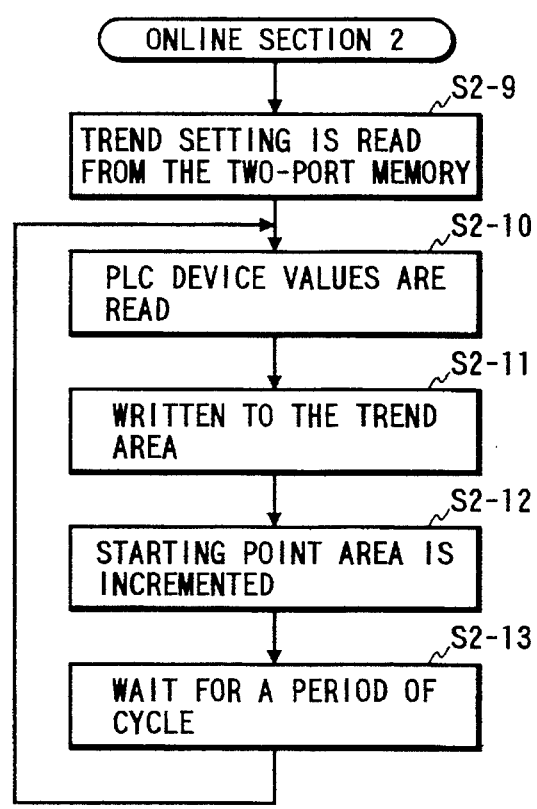

TWO-PORT MEMORY 216

TREND REGISTRATION AREA 217

| ELEMENT | WIDTH 400 | HEIGHT 300 | NUMBER OF POINTS 7 | NUMBER OF LINES 3 |
|---|---|---|---|---|
| PLC DEVICE | D2, | D3, | D4 | |
| CYCLE | 10 | | | |

STARTING POINT ↓

TREND AREA 218

STARTING POINT AREA 219

0

TREND VALUE AREA 220

| 8 : 00 : 10 |
| 20 |
| 40 |
| 60 |

TREND VALUE FLAG 221

1

TRANSITION OF TREND VALUE FLAG

0 : INITIAL VALUE (AT POWER-ON OF THE MONITOR APPARATUS)
1 : TREND VALUE SETTING
2 : TREND VALUE READING FINISHED

DEVICE TABLE

| FIRST DEVICE | NUMBER OF POINTS |
|---|---|
| D100 | 3 |
| D0 | 6 |
| ⋮ | ⋮ |
| : | : |

SCREEN DATA FILE                                                               ~11

SCREEN DATA 1

SCREEN 1 DISPLAY DATA

| NO. | COORDINATES | ATTRIBUTE | ELEMENT | PLC DEVICE | PROCESS SETTING |
|-----|-------------|-----------|---------|------------|-----------------|
| 1 | X,Y | CHARACTER | ASSEMBLY LINE 1 | — | — |
| 2 | X,Y | CHARACTER | PRODUCTION GOAL | — | — |
| 3 | X,Y | VALUE | — | D0 | — |
| 4 | X,Y | CHARACTER | UNITS | — | — |
| 5 | X,Y | CHARACTER | PRODUCTION RESULT | — | — |
| 6 | X,Y | VALUE | — | D1 | — |
| 7 | X,Y | CHARACTER | UNITS | — | — |
| 8 | X,Y | CHARACTER | ACHIEVEMENT RATIO | — | — |
| 9 | X,Y | VALUE | — | D1 | /D0*100 |
| 10 | X,Y | CHARACTER | % | — | — |
| ⋮ | ⋮ | ⋮ | ⋮ | ⋮ | ⋮ |

SCREEN 1 SWITCHING SETTING DATA

| FUNCTION KEY NO. | SWITCHING DESTINATION SCREEN NO. |
|------------------|----------------------------------|
| F1 | SCREEN NO. 2 |
| ⋮ | ⋮ |

SCREEN DATA 2

SCREEN 2 DISPLAY DATA

| NO. | COORDINATES | ATTRIBUTE | ELEMENT | PLC DEVICE |
|-----|-------------|-----------|---------|------------|
| 1 | X,Y | CHARACTER | ASSEMBLY LINE 2 | — |
| ⋮ | ⋮ | ⋮ | ⋮ | ⋮ |

SCREEN 2 SWITCHING SETTING DATA

| FUNCTION KEY NO. | SWITCHING DESTINATION SCREEN NO. |
|------------------|----------------------------------|
| F2 | SCREEN NO. 1 |
| ⋮ | ⋮ |

FIG. 33
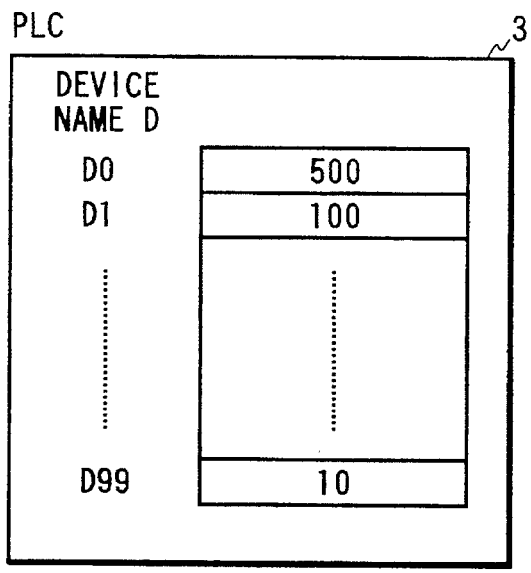
FIG. 35
SCREEN 1
ASSEMBLY LINE 1
    PRODUCTION GOAL    500 UNITS
    PRODUCTION RESULT    100 UNITS
    ACHIEVEMENT RATIO    20%
SCREEN 2
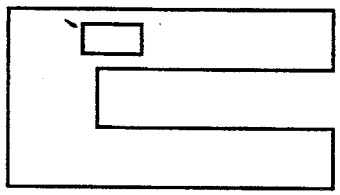
ASSEMBLY LINE 2

FIG. 40

SCREEN DATA FILE

SCREEN DATA 3

SCREEN 3 DISPLAY DATA

| NO. | COORDINATES | ATTRIBUTE | ELEMENT | PLC DEVICE | PROCESS SETTING | CYCLE |
|-----|-------------|-----------|---------|------------|-----------------|-------|
| 1 | X,Y | CHARACTER, | MACHINE QUANTITY GRAPH, BY PRODUCTS | — | —, | — |
| 2 | X,Y | CHARACTER, | ●—— NUMBER OF PRODUCTS A MACHINED, | — | ,, | — |
| 3 | X,Y | CHARACTER, | ✕—— NUMBER OF PRODUCTS B MACHINED, | — | ,, | — |
| 4 | X,Y | CHARACTER, | ○—— NUMBER OF PRODUCTS C MACHINED, | — | ,, | — |
| 5 | X,Y | TREND | WIDTH 400  HEIGHT 300, NUMBER OF POINTS 7, NUMBER OF LINES 3 | D2, D3, D4, | ,, | 10 |
| ......... | ......... | ......... | ......... | ......... | ......... | ......... |

LOG FILE                                                    ~17

SCREEN 3 LOG

| TIME | PLC DEVICE | D3 | D4 |
|---|---|---|---|
| 8 : 00 : 00 | 0  | 0  | 0  |
| 8 : 00 : 10 | 20 | 40 | 60 |
| 8 : 00 : 20 | 18 | 42 | 62 |
| 8 : 00 : 30 | 22 | 41 | 58 |
| 8 : 00 : 40 | 20 | 40 | 61 |
| 8 : 00 : 50 | 25 | 42 | 60 |
| 8 : 01 : 00 | 21 | 39 | 62 |
| 8 : 01 : 10 | 25 | 42 | 60 |
| 8 : 01 : 20 | 25 | 42 | 60 |
| ⋮ | ⋮ | ⋮ | ⋮ |

FIG. 48

SCREEN DATA FILE ~11

SCREEN DATA 1

SCREEN 1 DISPLAY DATA

| NO. | COORDINATES | ATTRIBUTE | ELEMENT | PLC DEVICE | PROCESS SETTING |
|---|---|---|---|---|---|
| 1 | X,Y | CHARACTER | ASSEMBLY LINE 1 | — | — |
| 2 | X,Y | CHARACTER | PRODUCTION GOAL 1 | — | — |
| 3 | X,Y | VALUE | — | D0 | — |
| 4 | X,Y | CHARACTER | UNITS | — | — |
| 5 | X,Y | CHARACTER | PRODUCTION RESULT | — | — |
| 6 | X,Y | VALUE | — | D1 | — |
| 7 | X,Y | CHARACTER | UNITS | — | — |
| 8 | X,Y | CHARACTER | ACHIEVEMENT RATIO | — | — |
| 9 | X,Y | VALUE | — | D2 | — |
| 10 | X,Y | CHARACTER | % | — | — |

SCREEN 1 SWITCHING SETTING DATA

| FUNCTION KEY NO. | SWITCHING DESTINATION SCREEN NO. |
|---|---|
| F1 | SCREEN NO. 2 |
| F4 | SCREEN NO. 4 |

SCREEN DATA 4

SCREEN 4 DISPLAY DATA

| NO. | COORDINATES | ATTRIBUTE | ELEMENT | PLC DEVICE | PROCESS SETTING |
|---|---|---|---|---|---|
| 1 | X,Y | CHARACTER | ASSEMBLY LINE 4 | — | — |
| 2 | X,Y | CHARACTER | NUMBER OF REMAINING PARTS | — | — |
| 3 | X,Y | CHARACTER | PART 1 | — | — |
| 4 | X,Y | VALUE | — | D40 | — |
| 5 | X,Y | CHARACTER | PART 2 | — | — |
| 6 | X,Y | VALUE | — | D41 | — |
| 7 | X,Y | CHARACTER | PART 3 | — | — |

SCREEN 4 SWITCHING SETTING DATA

| FUNCTION KEY NO. | SWITCHING DESTINATION SCREEN NO. |
|---|---|
| F2 | SCREEN NO. 1 |

SCREEN 1

```
ASSEMBLY LINE 1

PRODUCTION GOAL      500 UNITS

PRODUCTION RESULT    100 UNITS

ACHIEVEMENT RATIO    20%
```

SCREEN 4

| ASSEMBLY LINE 4 |  |
|---|---|
| NUMBER OF REMAINING PARTS | |
| PART 1 | 100 |
| PART 2 | 80 |
| PART 3 | 90 |
| PART 4 | 65 |
| PART 5 | 70 |

FIG. 51

SCREEN DATA ⁓8

SCREEN DATA 1

SCREEN 1 STATIC IMAGE DISPLAY DATA

| NO. | COORDINATES | ATTRIBUTE | ELEMENT |
|---|---|---|---|
| 1 | X,Y | CHARACTER | ASSEMBLY LINE 1 |
| 2 | X,Y | CHARACTER | PRODUCTION GOAL |
| 3 | X,Y | CHARACTER | UNITS |
| 4 | X,Y | CHARACTER | PRODUCTION RESULT |
| 5 | X,Y | CHARACTER | UNITS |
| 6 | X,Y | CHARACTER | ACHIEVEMENT RATIO |
| 7 | X,Y | CHARACTER | % |
| ⋮ | ⋮ | ⋮ | ⋮ |

SCREEN 1 ANIMATION DISPLAY DATA

| NO. | COORDINATES | ATTRIBUTE | PLC DEVICE |
|---|---|---|---|
| 1 | X,Y | VALUE | D0 |
| 2 | X,Y | VALUE | D1 |
| 3 | X,Y | VALUE | D2 |

SCREEN 1 SWITCHING SETTING DATA

| FUNCTION KEY NO. | SWITCHING DESTINATION SCREEN NO. |
|---|---|
| F1 | SCREEN NO. 2 |
| F4 | SCREEN NO. 4 |

SCREEN DATA 4

SCREEN 4 STATIC IMAGE DISPLAY DATA

| NO. | COORDINATES | ATTRIBUTE | ELEMENT |
|---|---|---|---|
| 1 | X,Y | CHARACTER | ASSEMBLY LINE 4 |
| 2 | X,Y | CHARACTER | NUMBER OF REMAINING PARTS |
| 3 | X,Y | CHARACTER | PART 1 |
| 4 | X,Y | CHARACTER | PART 2 |
| ⋮ | ⋮ | ⋮ | ⋮ |

SCREEN 4 ANIMATION DISPLAY DATA

| NO. | COORDINATES | ATTRIBUTE | PLC DEVICE |
|---|---|---|---|
| 1 | X,Y | VALUE | D40 |
| 2 | X,Y | VALUE | D40 |
| ⋮ | ⋮ | ⋮ | ⋮ |

SCREEN 4 SWITCHING SETTING DATA

| FUNCTION KEY NO. | SWITCHING DESTINATION SCREEN NO. |
|---|---|
| F2 | SCREEN NO. 1 |

SCREEN DATA 5                                                      14

| NO. | COORDINATES | ATTRIBUTE | ELEMENT | PLC DEVICE | PROCESS SETTING |
|-----|-------------|-----------|-----------------|------|---|
| 1   | X, Y        | CHARACTER | ASSEMBLY LINE   | —    | — |
| 2   | X, Y        | CHARACTER | PRODUCTION STATUS | —  | — |
| 3   | X, Y        | CHARACTER | PRODUCT TYPE    | —    | — |
| 4   | X, Y        | CHARACTER | CURRENT VALUE   | —    | — |
| 5   | X, Y        | CHARACTER | TYPE 1          | —    | — |
| 6   | X, Y        | VALUE     | —               | D100 | — |
| 7   | X, Y        | CHARACTER | TYPE 2          | —    | — |
| 8   | X, Y        | VALUE     | —               | D0   | — |
| 9   | X, Y        | CHARACTER | TYPE 3          | —    | — |
| 10  | X, Y        | VALUE     | —               | D5   | — |
| 11  | X, Y        | CHARACTER | TYPE 4          | —    | — |
| 12  | X, Y        | VALUE     | —               | D101 | — |
| 13  | X, Y        | CHARACTER | TYPE 5          | —    | — |
| 14  | X, Y        | VALUE     | —               | D102 | — |

SCREEN 5

ASSEMBLY LINE 5

PRODUCTION STATUS

| PRODUCT TYPE | CURRENT VALUE |
|---|---|
| TYPE 1 | 10 |
| TYPE 2 | 15 |
| TYPE 3 | 26 |
| TYPE 4 | 16 |
| TYPE 5 | 5 |

PLC SEQUENCE FILE  ~31

SEQUENCE

COMMENT

| DEVICE | COMMENT |
|--------|---------|
| X0 | START SWITCH |
| X1 | ROBOT FAULT |
| Y100 | START LED |
| Y101 | ROBOT FAULT LED |
| ⋮ | ⋮ |

FIG. 64

SCREEN 6

ASSEMBLY LINE

ROBOT FAULT

FIG. 65

SCREEN DATA FILE  11

SCREEN DATA 6

SCREEN 6 DISPLAY DATA

| NO. | COORDINATES | ATTRIBUTE | ELEMENT | PLC DEVICE | PROCESS SETTING |
|---|---|---|---|---|---|
| 1 | X,Y | CHARACTER | ASSEMBLY LINE | — | — |
| 2 | X,Y | CHARACTER | ROBOT FAULT | X0-ON | — |
| ⋮ | ⋮ | ⋮ | ⋮ | ⋮ | ⋮ |

MONITORING METHOD AND APPARATUS USING A PROGRAMMABLE LOGIC CONTROLLER

BACKGROUND OF THE INVENTION

1. Field of the Invention

The present invention relates to a monitoring method for gathering, via a programmable logic controller, information concerning the operating state of equipment, such as a robot, numerical control apparatus or the like, in an assembly line of a plant, and displaying messages indicating a fault, operating status or the like of said equipment on a display such as a CRT.

2. Description of the Related Art

FIG. 30 is a diagrammatic view of a system employing a conventional monitor apparatus. The system includes the monitor apparatus 1, a programmable controller 3 (hereinafter referred to as "PLC"), and a controlling LAN 2 which connects the monitor apparatus to the PLC. The PLC controls, for example, a robot or a numerical control apparatus 4. The PLC 3 has a device memory for storing information on the state of an input device (input equipment which detects the state of an object to be controlled), or the like, and controls the object to be controlled by executing a predetermined sequence program while referencing the contents of the device memory.

FIG. 31 is a block diagram showing the diagrammatic configuration of the conventional monitor apparatus 1 which monitors the status of a robot or a numerical control apparatus in an assembly line of a plant. The monitor apparatus 1 includes a CPU 5 which controls operation of the monitor apparatus, an auxiliary storage device 9 which stores a screen data file 11 (see FIG. 32), and a memory 8 which stores programs for operating the monitor apparatus and screen data read from the screen data file of the auxiliary storage device 9. The monitor apparatus 1 further includes a PLC interface 6 for facilitating communication between the PLC 3 and the monitor apparatus 1, a CRT 7, and a keyboard 10.

FIG. 32 shows an example of a screen data file 11, in which the data of screens 1 and 2 has been registered. The screen data consists of screen display data 100 and screen switching setting data 101. The screen display data 100 registered is the elements of each graphic used to display a display, such as that shown in FIG. 35.

For example, in the screen 1 display data 100 shown in FIG. 32, No. 2 indicates that characters "PRODUCTION GOAL" are displayed at coordinates (x, y) of the CRT 7. No. 3 indicates that the value of PLC device D0 is displayed at coordinates (x, y) of the CRT 7. No. 9 indicates that the result of processing the value of PLC device D1, according to a process setting, is displayed at coordinates (x, y) of the CRT 7. That is, No. 9 indicates that the value of PLC device D1 is divided by the value of D0 and the result of the division is multiplied by 100, as indicated by the process setting.

A predetermined number of PLCs 3 are connected to the controlling LAN 2 as shown in FIG. 30. A PLC device (D0, D1, or the like), described in one screen data, is not always, but may be, present in a PLC.

A process setting is represented by arithmetic expressions, such as, "*" (multiplication), "/" (division), "+" (addition) and "−" (subtraction). Numerical values and PLC devices are combined, for example, as follows:

Arithmetic expression and numerical value, such as *100, /100, +100, −100, etc;

Arithmetic expression and PLC device, such as *W0, /W0, +W0, −W0, etc; and

Arithmetic expression, numerical value and PLC device, such as/D0*100, etc.

By using a process setting, as described above, the value of an achievement ratio can be displayed on a monitor screen as shown, for example, in FIG. 35. The screen switching setting data that is registered indicates to which screen the current screen will be switched. In the screen switching setting data in FIG. 32, for example, the [F1] function key and "screen 2" have been registered, indicating that pressing the [F1] key of the keyboard switches screen 1 to screen 2.

FIG. 33 shows an example of PLC devices in the PLC 3. In a device D, there are 100 areas from 0 to 99, and the devices are represented D0 to D99. In one area, any of the numerical values 0 to 65535 can be entered. FIG. 33 shows that 500 is in D0 and 100 is in D1.

FIG. 34 is a block diagram showing the function of the monitor apparatus 1. An operator uses a screen setting function 1-1 to create a monitor screen, such as that shown in FIG. 35, on CRT 7 on an interactive basis, and to write data representing the screen to the screen data file 11, shown in FIG. 32. In an off-line section, the screen is created with the screen setting function 1-1. To change the screen, the screen data file can be read and corrected.

An initialization function 1-2, on the other hand, is used to read the screen data file 11, stored in the auxiliary storage device 9, and write it to the memory 8. The file is written to the memory 8 before the screen is displayed, since the speed of reading the file from the auxiliary storage device 9 is slow.

A display function 1-3 is employed to read a monitor setting registered in the memory 8 and display it on the CRT 7, or to read a PLC device value from the PLC interface 6 and display it on the CRT 7. For instance, if the value of PLC device D0 is 500, 500 is displayed on the CRT 7. Also, when a function key is pressed, function 1-3 checks the screen switching setting data in the memory 8 and displays the screen corresponding to that function key, if such a corresponding screen exists. The screen setting function 1-1, the initialization function 1-2 and the display function 1-3 are constituted by programs in the memory 8 and executed by the CPU 5.

FIG. 36 is an operation flowchart of a conventional off-line section. The following operation sequence generates screens 1 and 2.

At step S1-1, screen 1 is created. At step S1-2, the setting of screen switching data for switching from screen 1 to another screen is performed. At steps S1-3 and S1-4, respectively, screen 2 is created and the setting of screen switching data is performed as in screen 1. At step S1-5, the screens created and the data setting performed are stored into the auxiliary storage device 9 as a screen data file. Steps S1-1 to S1-5 are implemented by the screen setting function 1-1.

FIG. 37 is an operation flowchart of a conventional on-line section. The following operation sequence effects the displaying of a screen data file, such as that shown in FIG. 32, which is created in the off-line section as the screen shown in FIG. 35

At step S1-6, the screen data file 11 is read from the auxiliary storage device 9 and written to the memory 8. At step S1-7, screen 1 is displayed. At step S1-8, a device is read from the PLC 3 via the PLC interface 6.

At step S1-9, the device read from the PLC 3 is displayed. If process setting has been defined in the screen data, mathematical operations are performed on the value read from the PLC 3 per the process setting, and the result is displayed.

As discussed above, at step S1-7, screen 1 is displayed. The screen 1 is a static screen forming a background screen which does not depend on the contents of the device memory of the PLC, and in particular, the screen 1 represents a default static screen (a screen where no static screen is specified). At step S1-10, it is determined whether or not a corresponding key has been pressed.

At step S1-11, it is determined whether the value entered through the keyboard matches the screen switching setting data. Since the screen switching data for screen 1 represents [F1], for example, it is determined whether or not the key pressed is [F1]. At step S1-12, the static screen selected is displayed. It should be noted that step S1-6 is executed by the initialization function 1-2, and steps S1-7 to S1-12 are implemented by the display function 1-3.

A description will be given of a trend display in the conventional monitoring method.

FIG. 38 shows a trend screen 3 in a conventional monitor apparatus. The trend screen 3 displays the quantities of three different products machined on a time-of-day basis, with the horizontal axis indicating the time-of-day and the vertical axis indicating the quantity.

FIG. 39 shows the sequential displaying of the trend screens, indicating that the quantity of each product changes at intervals of 10 seconds.

FIG. 40 shows an example of a screen data file 11 used to display the trend screen 3. As shown in this figure, one trend has been registered. For instance, No. 5 in screen 3 display data indicates that a trend of width 400 and height 300 is displayed at coordinates x, y of the CRT 7, and that the number of points in the horizontal axis is 7 and three values of PLC devices D0, D1, D2 are displayed at intervals of 10 seconds.

FIG. 41 is a block diagram showing the operation of the monitor apparatus. A trend display function 1-2 is employed to read a trend setting registered in the memory 8, to read PLC device values from the PLC interface 6, and to display trends on the CRT 7. The trend display function is constituted by a program in the memory 8 and executed by the CPU 5.

FIG. 42 is an operation flowchart of a conventional on-line section. The following operation sequence effects the displaying of the screen data file as shown in FIG. 40, which was created in the off-line section as the screen shown in FIG. 38.

Step S1-6 is identical to step S1-6 in the conventional example discussed above, as shown in FIG. 37. At step S2-1, screen 3 is displayed. At step S2-2, the area of the CRT 7 displaying the trends is written to the memory 8, shown as step 1 in FIG. 43. At step S2-3, the area shifted by one point is written from the memory 8 to the CRT 7, shown as step 2 in FIG. 43.

At step S2-4, the values of devices D2, D3 and D4 are read from the PLC 3. At step S2-5, the values read are displayed on the CRT, shown as step 3 in FIG. 43. At step S2-6, the operation is repeated after 10 seconds have elapsed, resuming at step S2-2. Step S1-6 is executed by the initialization function 1-2, and steps S2-1 to S2-7 are executed by the trend display function 1-3.

Preparation of a log file in the conventional trend display will now be described.

FIG. 44 is a block diagram showing how PLC device values displayed on a trend screen are written to a log file 17 in the conventional monitor apparatus. A log function 1-3 writes to a log file 17 the PLC device values read from the PLC 3, and the time-of-day when the values were read. The log function 1-3 is constituted by a program in the memory 8 and implemented by the CPU 5.

FIG. 45 shows an example of a log file containing time-of-day data, and the values of PLC devices D2, D3 and D4. The log file, which is stored in the auxiliary storage device 9, is copied by an operator onto a floppy disk in a floppy disk device 18 (see FIG. 46), and is used to display and analyze past trends on the CRT of another monitor apparatus.

FIG. 46 is a block diagram of the monitor apparatus, which includes a floppy disk device 18.

FIG. 47 is an operation flowchart of a conventional on-line section. Steps S1-6 to S2-5 are identical to corresponding steps in the conventional example discussed above and shown in FIG. 42.

At step S3-1, PLC device values, read from the PLC 3, and data representing the time-of-day are written to the log file 17. Step S3-1 is executed by the log function 3-1. Step S2-6 is identical to step S2-6 in the FIG. 42.

A conventional method of separating the screen data file 11 into static image display data and animation display data, and registering the separated data into the memory 8, will now be described.

FIG. 48 shows an example of a screen data file 11. In this figure, the data of screens 1 and 4 has been registered. The definition of data in the screen data file is the same as in FIG. 32, and the file registered has each graphic element used to display screens as shown in FIG. 49. Also, the screen switching setting data registered for screen 1 indicates that switching to screen 4 can be performed by pressing the [F4] key, and the data for screen 4 indicates that switching to screen 1 can be performed by pressing the [F2] key.

FIG. 50 is a block diagram showing the operation of the monitor apparatus which uses the conventional method described above, which includes a screen setting function 1-1 identical to that shown in FIG. 34. The conventional initialization function 4-2 is different from the initialization function described with reference to FIG. 34, in that it reads the screen data file 11 stored in the auxiliary storage device 9, and registers to the memory 8 the data having the attribute of a PLC device setting as animation display data and the other data as static image display data, as shown in FIG. 51. Also, this initialization function 4-2 defines the setting of a display screen number 4-5 on screen 1 as an initial screen.

A display function 4-3 displays on the CRT 7 the static image display data registered in the memory 8 according to the screen number specified by the display screen number 4-5, or reads PLC device values from the PLC interface 6 and displays them on the CRT 7.

The display processing and processing of screen switching by pressing a corresponding function key are similar to the display function 1-3 in FIG. 34, but are different therefrom in that the screen data handled has a format shown in FIG. 51, which is registered in the memory 8 by the initialization function 4-2. A display screen number 4-5 is used to set the screen number displayed by the display function 4-3. As in FIG. 34, the initialization function 4-2 and the display function 4-3 are constituted by programs in the memory 8 and are implemented by the CPU 5.

FIG. 52 is an operation flowchart of a conventional on-line section. At step S4-6, the screen data file 11 is read, and depending on the attribute, data with the setting of PLC devices is registered as animation display data and data without that setting is registered as static image display data. At step S4-13, the display screen number 4-5 is set to 1 as an initial display screen.

At step S4-7, the static image of the screen number specified in the display screen number 4-5 is displayed from the static image display data registered in the memory 8. At step S4-8, the PLC device values of the animation display data specified in the display screen number 4-5 are read from the PLC 3 via the PLC interface 6. At step S4-9, the device values read from the PLC 3 are displayed.

Step S4-10 is identical to step S1-10 in FIG. 37, and step S4-11 is identical to step S1-11 in FIG. 37. At step S4-12, the switching destination screen number of the screen switching setting data is set to the display screen number 4-5. The screen number set is displayed on the CRT 7 at steps S4-7, S4-8 and S4-9.

In this conventional example, the format of registering the screen data file 11 to the memory 8 is divided into the static image display data and the animation display data, whereby the animation display data, which is kept animated by the operation of the on-line section, is collected in a block to carry out the retrieval and reading processing of data at higher speed than in the conventional processing performed as shown, for example, in FIG. 37.

A conventional method of transmitting data to and from the PLC will now be described.

FIG. 53 shows the data formats of a PLC device read request and a response to and from the PLC interface 6 in FIG. 31. Request data 5-1 is where the first device to be read (1 word) and the number of points to be read (1 byte) are set. In this setting example, one point is to be read from D0.

Response data 5-2 is where the values of the devices (1 word), set in the request data 5-1, are arranged in order, starting with the first device. In this example, the value of D0 returned is 10.

Time required for the PLC interface 6 to read devices from the PLC3 can be calculated by the following equation:

Read time=(communication overhead)+(number of points)*(processing time)

where the processing time depends on the performance of communication between the PLC interface 6 and the PLC 3. For example, if the performance is 9600 bps, processing time required for one device point (3 bytes of request data+2 bytes of response data=5 bytes) is as follows:

5*8/9600≧4.17ms.

The communication overhead is a length of time from when the PLC 3 receives request data until when it processes that data (normally, this processing is executed once every time the PLC 3 runs the program once), and its maximum value is equal to the operating time of the program. For instance, when request data is sent to the PLC 3, which is executing a program of 10 ms operating time, a maximum of 10 ms communication overhead is generated.

FIG. 54 shows an example of screen data 14. This figure shows the data of screen 5 used to display a screen shown in FIG. 55. The definition of the data in the screen data is the same as in FIG. 32. In the example shown in this figure, the PLC device setting alternates with data having the attribute of characters in sequence create the screen data, that is, in the order of D100, D0, D5, D101 and D102.

FIG. 56 is a flowchart showing the details of PLC device reading processing operation at step S1-8 in FIG. 37. At step S5-1, it is determined whether or not the remaining display data of the screen number displayed exists. When the processing has been performed up to the end of the screen data, the operation proceeds to the next step S1-9 in FIG. 37.

At step S5-2, one section of display data (1 set of data of graphic elements) is read from the screen data of the screen number displayed. At step S5-3, the attribute of the display data read at step S5-2 is checked to determine whether the PLC device must be read. At step S5-4, the value of one device is read from the PLC 3 via the PLC interface 6 according to the PLC device setting of the display data read at step S5-2.

Next, a description will be given of a conventional method used for displaying comment information.

FIG. 57 shows a conventional system configuration where the PLC is used. In this figure, a PLC peripheral device 19 is employed to create the sequence of the PLC and monitor the sequence.

FIG. 58 is a block diagram showing a diagrammatic configuration of the PLC 3 and the PLC peripheral device 19. A CPU 20 performs the sequence, which is stored in a memory 21. The sequence is loaded from the PLC peripheral device 23 and entered into the memory via a PLC peripheral device interface 26. A PLC interface 22 is provided in the PLC 3 to communicate with the other PLC and monitor apparatus 1.

An I/O 24 controls a robot or numerical control apparatus 4. A CPU 25 creates a sequence and monitors the status of the PLC 3. A memory 27 contains functions used to create the sequence and monitor the status of the PLC 3. A floppy disk device 30 stores the sequences created. The sequence created is loaded to the PLC 3 and the status of the PLC 3 is monitored via a PLC peripheral device interface 26. Finally, the peripheral device includes a CRT 28 and a keyboard 29.

FIG. 59 shows an example of a PLC sequence. As shown, when a start switch X0 (input device 0) turns on, a start LED Y100 (output device 100) turns on. Then, when a robot fault X1 (input device 1) turns on, a robot fault LED Y101 (output device 101) turns on. Such a sequence is written using the CRT 28 and the keyboard 29 of the PLC peripheral device 19.

FIG. 60 shows an example of storing the sequence example, as shown in FIG. 59, as a PLC sequence file. The file consists of a sequence area and a comment area. In the comment area, comments are registered in correspondence with devices.

FIG. 61 is a block diagram showing the operation of the PLC 3 according to a conventional method. Function 6-1 indicates that the operator creates a sequence using the CRT 28 and the keyboard 29, and subsequently stores it to a PLC sequence file 31. A PLC sequence writing function 6-2 used to read the PLC sequence file 31 and write it to the PLC 3.

A PLC sequence monitoring function 6-3 reads PLC device values from the PLC peripheral device interface 26 and displays them on the CRT 28. For instance, the values of PLC devices X0, X1, Y100, Y101 are read and displayed on the CRT as described below.

An example of monitoring is shown in FIG. 62. This figure monitors that X0 is on, Y100 is on, X1 is off, and Y101 is off, in accordance with the following display characteristics.

Device X ON ✱

Device X OFF ╫

Device Y ON ✱

Device Y OFF ✱

FIG. 63 is a flowchart of operating the conventional PLC and monitoring the state of the PLC. At step S6-1, the operator uses the CRT 28 and the keyboard 29 to create a sequence. At step S6-2, the sequence created is written to the PLC sequence file 31 onto the floppy disk of the floppy disk device 30.

At step S6-3, the sequence is written to the PLC 3. At step S6-4, the PLC device values are read from the PLC peripheral device interface 26 and displayed on the CRT 28.

FIG. 64 shows an example of a screen 6 displayed in the monitor apparatus. In this figure, the state of X0 of the PLC 3 was read, and X0 was "on" to indicate a robot fault.

FIG. 65 shows an example of a screen data file for FIG. 64. No. 2 indicates that when PLC device X0 turns on, a robot fault is displayed at coordinates x, y.

The operations of off-line and on-line sections in FIGS. 64 and 65 are the same as in the examples described above. As shown, NO. 2 indicates display of a robot fault at coordinates x and y when X0 of the PLC device is turned on.

The conventional systems described above have the following disadvantages.

Because the conventional systems include only a single CPU, when this CPU is operating to read a PLC device and display the data read from the PLC device on the CRT 7, the CPU cannot operate to monitor the status of the keys, that is, to check whether or not a particular key was pressed. Hence, when the CPU operates to read a large number of PLC devices and to display the information read from these PLC devices on the CRT 7, this operation requires a long period of time to be performed.

For example, the operation of reading 40 PLC devices and setting the data read from these devices can take 2 seconds, as illustrated by the following equations:

Processing time of one PLC device = (read request
    transmission time of communication processing apparatus) +
    (response time of communication processing apparatus) +
        (processing time of PLC)    =    20 ms + 20 ms + 10 ms
                                =    50 ms Hence, if 40 PLC devices are being displayed and any key is pressed, there is no response for approximately 2 seconds, which results in poor operability. Because of this problem, the appropriate number of PLC devices that can be displayed on one screen is only about 20.

Furthermore, since processing is performed in series, that is, trend data is transferred from the CRT 7 to the memory 8, the data shifted by one point is written from the memory 8 to the CRT 7, and the PLC devices are read to update the displayed trend. Thus, it takes a long time to display trends.

For example, in the conventional system, it may take approximately 1.11 seconds to display the trends of 10 PLC devices. This is illustrated by the following equations:

Screen display time = (CRT-to-memory transfer time (a
    time required to transfer portions of a current screen
    image except for one pitch portion at left end thereof to
    memory) + (processing time to update a portion of one pitch
    at the right end of the screen) + (wrtie time from memory to CRT)
                              =    300 ms + 10 ms + 300 ms
                              =    610 ms while the read time of 10 PLC devices is as follows:
                          =    (read time of one PLC device × 10)
                          =    50 ms × 10
                          =    500 ms Hence, in the conventional system, displaying a trend takes 610 ms+500 ms=1.11 seconds. Therefore, the trends could not be displayed at intervals of less that 1.11.

In addition, since PLC device values are written to a long file and then displayed, it takes a long time to display trends. For instance, as illustrated by the following equations, it takes 1.61 seconds to display the trends of 10 PLC devices.

Screen display time=610 ms
Read time of 10 PLC devices=500 ms
Write time to log file=500 ms.

Hence, the trend display in this case takes 610 ms+500 ms+500 ms=1.61 seconds

Therefore, the trends could not be displayed at intervals of less than 1.61 seconds.

Furthermore, when one screen is switched to another, static image data is displayed on the CRT, PLC devices required to display animation data is then read, and the animation data is subsequently displayed, whereby it take time until all graphic elements are displayed after screen switching.

For example, if a screen data file requires two seconds to display static image data, two seconds to read PLC devices, and one second to display animation data, a static image area is displayed two seconds after screen switching, and in two seconds, animation begins to be displayed. That is, a total of five seconds is required to display all graphic elements on the CRT.

In addition, when PLC devices are to be read, data in screen data requiring PLC devices to be read is retrieved, and the devices are read on a point-by-point basis, whereby communication overhead time is generated for every one point of the set PLC devices.

For example, when the PLC running the program of 10 ms operating time and the screen data 5 in FIG. 54 is to be monitored, assume that the average communication overhead time is 5 ms (10ms/2) and the performance of communication between the PLC interface 6 and the PLC 3 is 9600 bps. Hence, the read time of one device point is as follows:

0.005+(5*8/9600)≈9.17ms.

Since five points of PLC devices have been set in the screen data 5, the read time of the PLC devices on one screen is as follows:

9.17*5=45.9 ms.

Finally, when a sequence is created with the PLC peripheral device in the conventional system, comments such as a robot fault are created using the CRT and keyboard. Also, in the monitor apparatus, a robot fault, etc., are entered as monitoring data.

Since the comments and monitoring data have the same meanings but exist separately, the same data had to be entered twice, resulting in much time and labor, and a large number of input processes.

SUMMARY OF THE INVENTION

Accordingly, an object of the present invention is to provide a system that responds quickly when a key is pressed to initiate screen switching. To achieve this object, the system of the present invention employs two CPUs. One of the two CPUs is used to communicate with the heavily loaded PLC, that is, to process devices read from the PLC, and return the result to a two-port memory. The other CPU is used to read the result from the two-port memory and display it on the CRT, thereby achieving fast monitor display.

Specifically, a first CPU reads, from a first memory in which a predetermined number of screen data representing a screen display are stored, the predetermined number of addresses of the device memory, which are described in the predetermined number of screen data, and writes the predetermined number of addresses to a two-port memory. A second CPU sends each of the predetermined number of addresses written in the two-port memory to the programmable controller, reads the contents at each of the addresses of the device memory from the programmable controller, and writes to the two-port memory the contents read or a result obtained by performing a predetermined calculation on the read contents. While the second CPU these processes, the first CPU executes display processes for the display based on the predetermined number of screen data, except for those display process being performed by the second CPU. Hence, the operation of the first CPU is superimposed on that of the second CPU with respect to time.

Further, the second CPU reads, based on the predetermined number of screen data, parts of the contents read in the second-port memory which are necessary for screen display, and executes a display process to display the read parts of the contents. By performing the above processes using two CPUs, the response of the monitor screen display is maintained at high speed, and the response time for switching between the screens is also minimized.

Another object of the present invention is to provide a system capable of displaying trends at intervals of one second. To achieve this object, the system comprises two CPUs. One of the two CPUs is used to communicate with the heavily loaded PLC, and to write device value data, representing an image to be displayed on the CRT, to the two-port memory. The other CPU reads the values from the two-port memory and displays them on the CRT.

The first and second CPUs perform operations as described above. Specifically, the first CPU reads the contents of the two-port memory written by the second CPU, and executes a display process so that values for the predetermined number of devices to be trend-displayed are displayed on the display on the basis of the read contents. The second CPU, on the other hand, reads the contents at the predetermined number of addresses from the device memory of the programmable controller, writes to the two-port memory the read contents or a result obtained by performing predetermined calculations on the read contents. The second CPU performs these operations while the first CPU is reading the contents of the two-port memory written by the second CPU.

Then, the first CPU executes a display process so that a change of the predetermined number of devices to be trend-displayed is illustrated on the display in a cycle which is described in the screen data. Therefore, high operability of key input is maintained, and the response time of the monitor screen display is low.

A further object of the present invention is to provide a system capable of obtaining log file data while trends are being displayed at intervals of one second. To achieve this object, the system includes two CPUs. One of two CPUs is used to communicate with the PLC and write the values of read devices and the read time of day to the two-port memory. The other CPU is used to read the values from the two-port memory and write them to the log file.

In this embodiment, the first and second CPUs perform operations as described above. Further, since the first CPU writes information based on the contents of the two-port memory, written by the second CPU, to a log file, high operability of key input is maintained, and the response time of the screen display is low, even when the display contents are being stored in the log file.

A fourth object of the present invention is to provide a system having reduced screen switching time. To achieve this object, the system of the present invention includes two CPUs, and a display screen number is provided in the two-port memory of the system. One CPU is used to read PLC devices corresponding to the display screen number and write them to the two-port memory. The other CPU is used to read the values from the two-port memory and display them on the CRT.

As in the embodiments described above, the first and second CPUs performs different operations at the same time. Therefore, high operability of key input is maintained, and the response time of monitor screen display is low.

A fifth object of the present invention is to provide a system having two CPUs, wherein one of two CPUs is used to read consecutive devices in a block and to write their values to the two-port memory during communication with the PLC. The other CPU is used to read the values from the two-port memory and display them on the CRT.

In this embodiment, the first and second CPUs perform different operations simultaneously as described above. Further, the second CPU judges whether there are a series of addresses of the device memory which are sent to the programmable controller. If there is such a series of addresses, the second processor simply sends to the programmable controller a head address and the number of the addresses following the head address without sending the series of addresses. Therefore, high operability of key input is maintained, and the response time of monitor screen display is kept low, even when the contents of the device memory stored in continuous addresses is displayed.

A further object of the invention is to provide a system wherein the creation time of a monitor screen on the monitor apparatus is reduced. To achieve this object, the comments of a PLC sequence created by a PLC peripheral device are used to create the screen of the monitor apparatus. Also, the comments of a PLC sequence stored in the PLC are used to create the screen of the monitor apparatus.

In this embodiment, the first and second CPUs perform different operations simultaneously as described above. Further, an offline section reads, from a sequence file in which information prepared by the peripheral device connected to the programmable controller is stored, a comment having the sequence file, prepares screen data by adding the read comment, and transfers the predetermined number of screen data$^i$ prepared to the first memory. Therefore, the comment information need not be entered from the monitor apparatus.

BRIEF DESCRIPTION OF THE DRAWINGS

FIG. 9 is a flowchart showing the operation of the monitoring method according to the second embodiment of the present invention;

FIG. 10 is a flowchart showing a further operation of the monitoring method according to the second embodiment of the present invention;

FIG. 32 is a diagram showing a conventional screen data file;

FIG. 33 is a diagram showing conventional devices in a PLC;

FIG. 35 is a diagram showing display screens 1 and 2 of the monitor apparatus in which the conventional monitoring method is used;

FIG. 40 is a diagram showing a screen data file;

FIG. 45 is a diagram showing a log file;

FIG. 48 is a diagram showing a conventional screen data file;

FIG. 51 is a diagram showing conventional screen data;

FIG. 64 is a diagram showing a screen of the monitor apparatus in which the conventional monitoring method is used; and FIG. 65 is a diagram showing a screen data file.

DETAILED DESCRIPTION OF THE PREFERRED EMBODIMENTS

An embodiment of a monitor apparatus of the present invention will now be described in accordance with the drawings.

Figure 1:
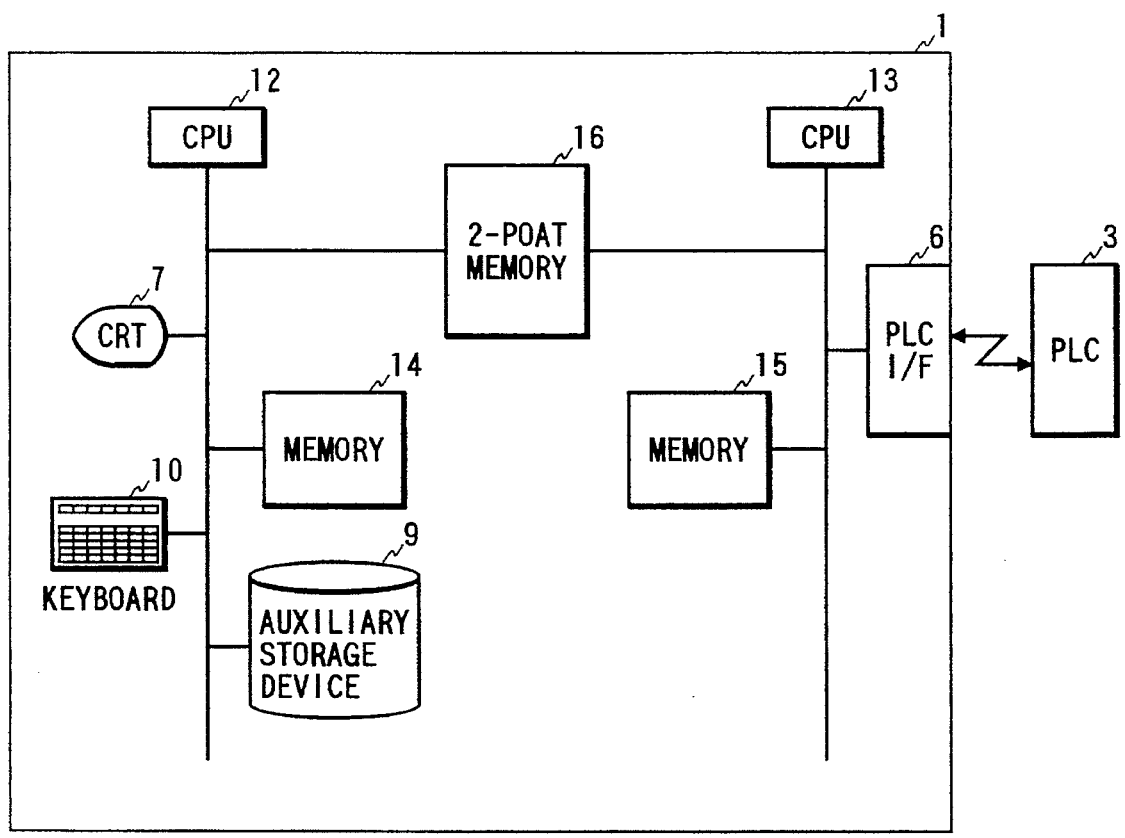
FIG. 1 is a block diagram of a monitor apparatus in which the monitoring method according to a first embodiment of the present invention is used.

FIG. 1 is a block diagram of a monitor apparatus 1 in which the monitoring method of the invention is used. Reference characters identical to those in the figures illustrating the conventional apparatus designate components corresponding to those in the conventional apparatus.

As shown in FIG. 1, the monitor apparatus includes a first memory 14 which contains programs used for the operation of the monitor apparatus, the display of data on the CRT, and the entry of data from the keyboard as well as screen data read from the screen data file of the auxiliary storage device. A first processor 12, such as a CPU or the like, runs the programs in first memory 14.

A second memory 15 stores programs used to read PLC devices 3, coupled to a two-port memory 16 via a PLC interface 6, and to write their values to the two-port memory 16. A second processor 13, such as a CPU, runs the programs in memory 15. A two-port memory 16 is provided to facilitate data communication between the CPU 12 and the CPU 13.

Figure 2:
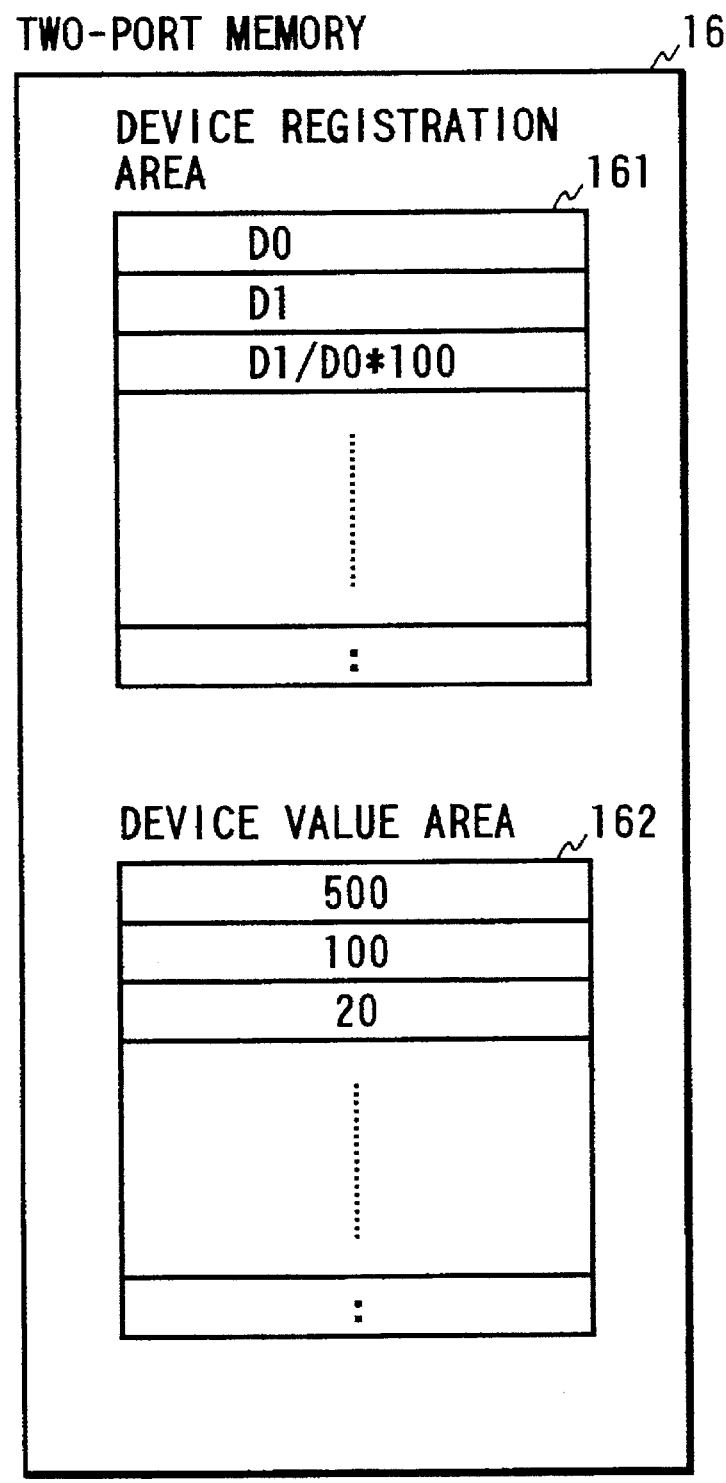
FIG. 2 is a diagram showing a two-port memory according to the first embodiment of the present invention as shown in FIG. 1.

FIG. 2 illustrates an example of the two-port memory 16, which has a device registration area 161 and a device value area 162. In the device registration area 161, devices which the CPU 12 requests the CPU 13 to read are registered. In FIG. 2, D0 and D1 have been registered in the two-port memory, and the CPU 13 reads the values of D0 and D1 from the PLC 3 via the PLC interface 6. In the device value area 162, the values of the devices read by the CPU 13 at the request of the CPU 12 are written. As shown in FIG. 2, the values of D0, D1 and D1/D0*100, and 500, 100 and 20, read from the PLC 3, have been written.

Figure 3:
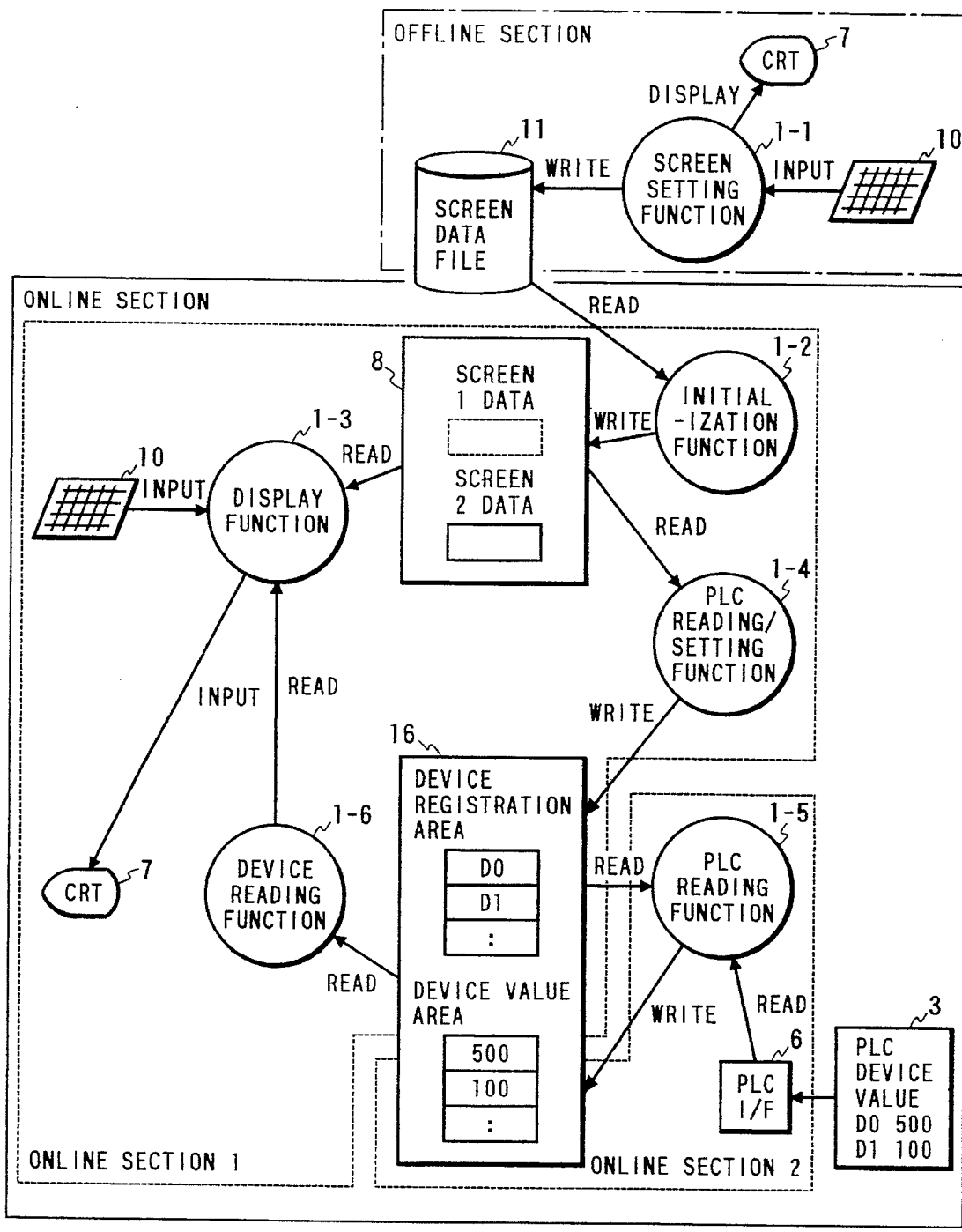
FIG. 3 is a functional diagram of the monitor apparatus in which the monitoring method according to the first embodiment of the present invention is used.

FIG. 3 is a block diagram showing the operation of the monitor apparatus when the monitoring method of the present invention is used. A PLC reading/setting function 1-4 retrieves from the screen data of the memory 8 the devices to be read from the PLC 3, and sets the values of these devices in the device registration area 161 of the two-port memory 16.

A PLC reading function 1-5 reads the values of the PLC devices, set in the device registration area 161 of the two-port memory 16, from the PLC 3 via the PLC interface 6, and writes them to the device value area 162 of the two-port memory 16. If process setting has been made, this function performs calculations and writes the result of the calculation.

A device reading function 1-6 is called by the display function 1-3 when PLC device values have been read and reads the device values stored in the device value area 162 of the two-port memory 16. An initialization function 1-2, the display function 1-3, the PLC reading/setting function 1-4 and the device reading function 1-6 are all constituted by the programs in memory 14, and are executed by the CPU 12. The PLC reading function 1-5, however, is constituted by the program in memory 15, and is executed by the CPU 13.

Figure 4:
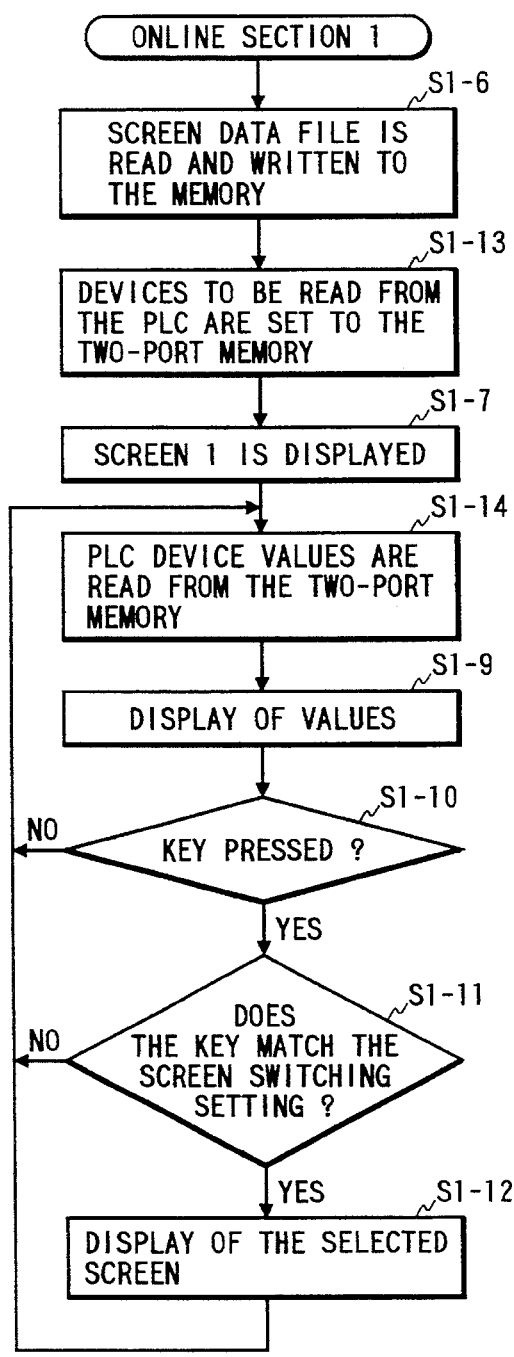
FIG. 4 is a flowchart showing the operation of the monitoring method according to the first embodiment of the present invention.
Figure 37:
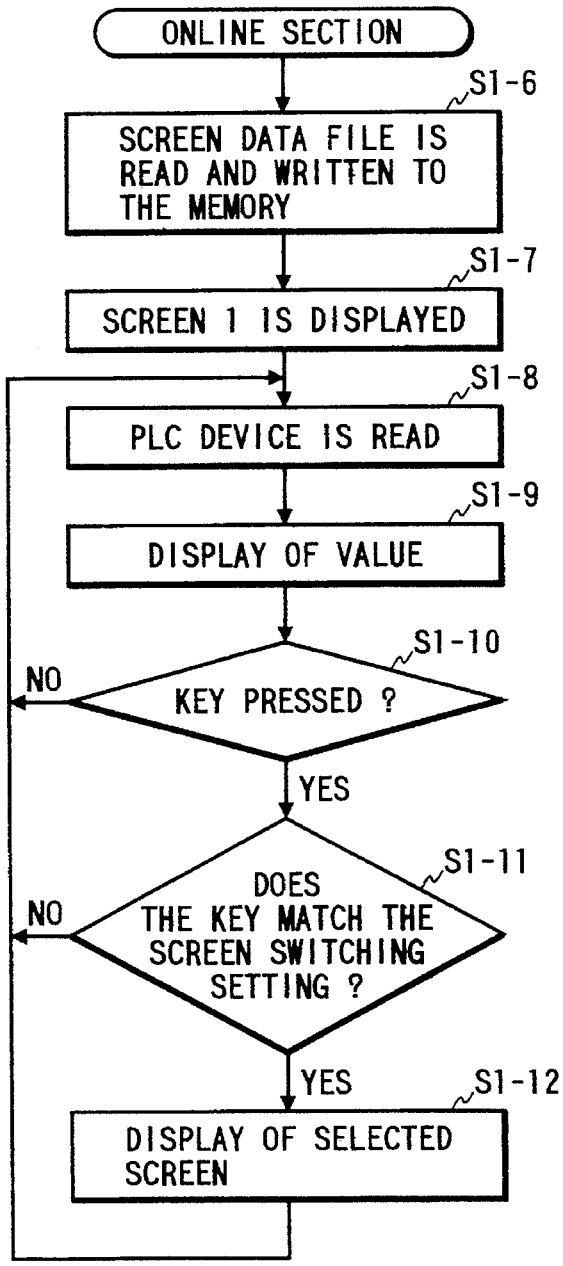
FIG. 37 is a flowchart showing the operation of the conventional monitoring method.
Figure 38:
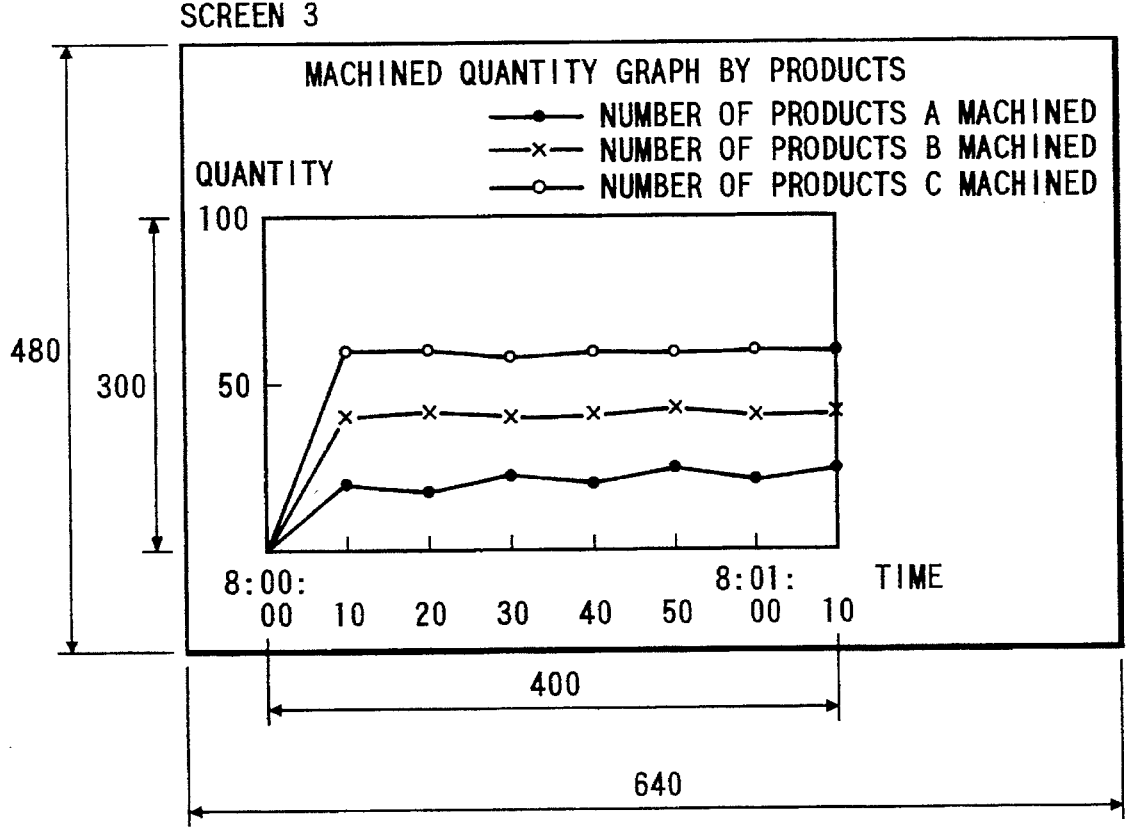
FIG. 38 is a diagram showing display screen 3 of the monitor apparatus in which the conventional monitoring method is used.
Figure 39:
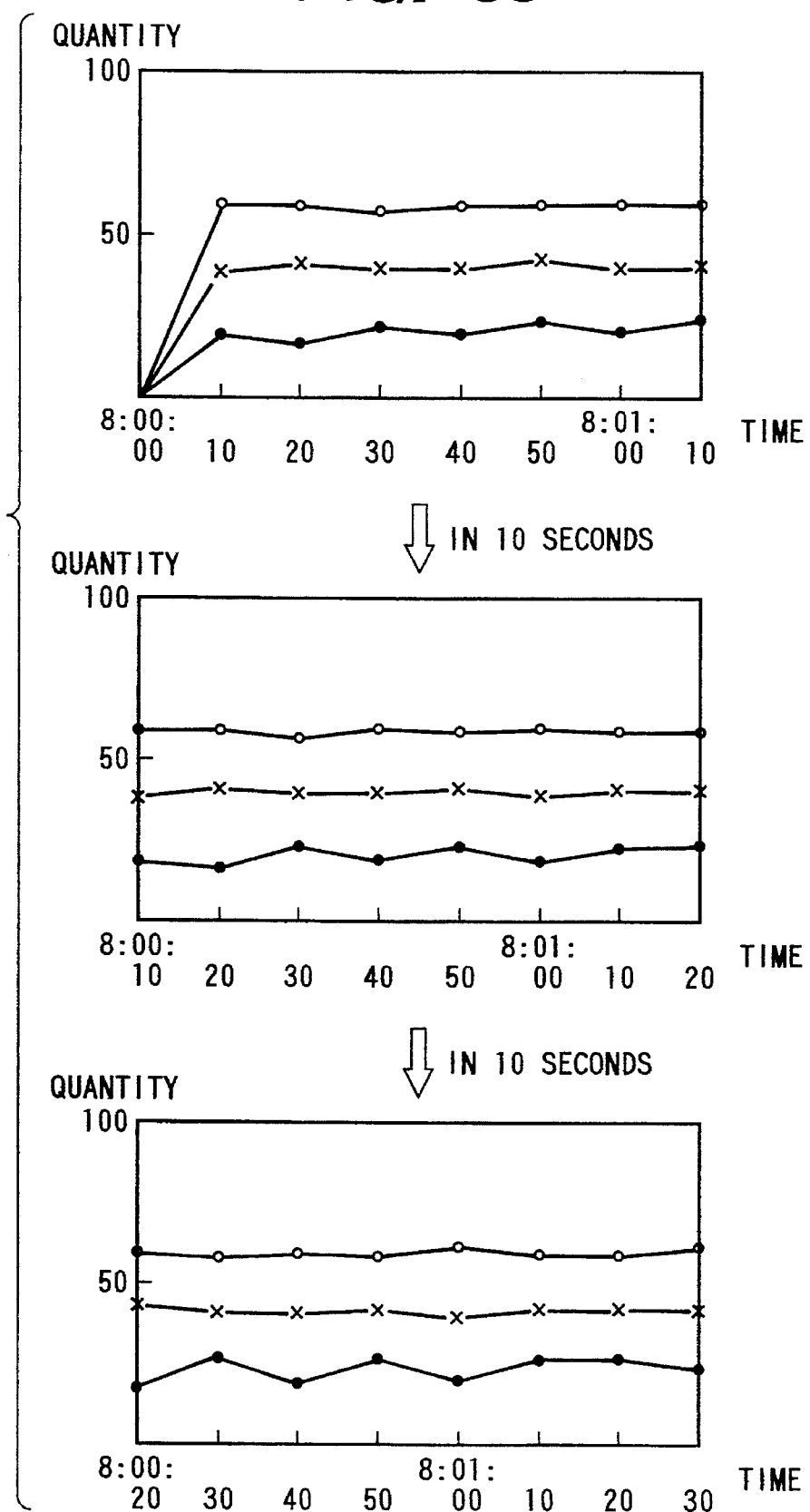
FIG. 39 is a diagram showing the transition of trends on a trend screen.
Figure 41:
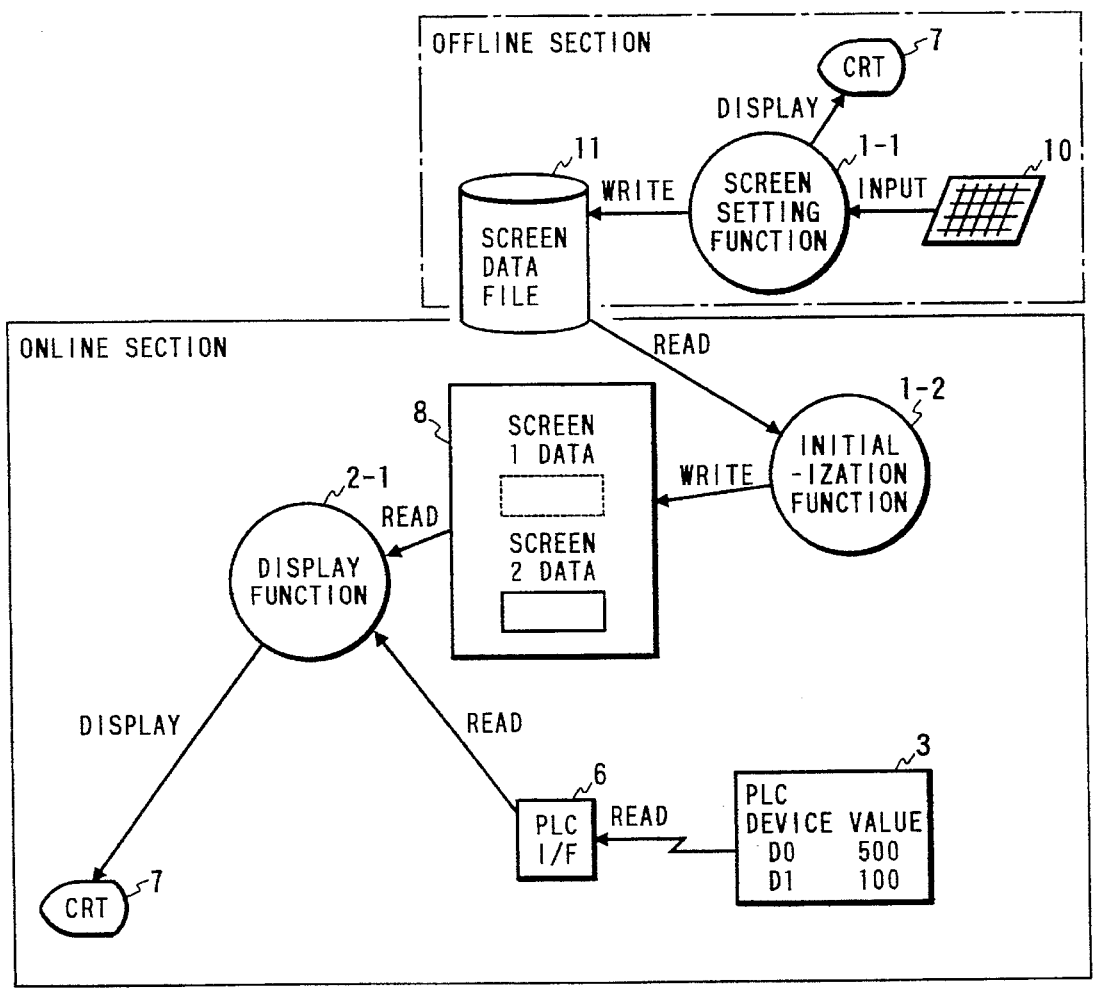
FIG. 41 is a functional diagram of the monitor apparatus in which a conventional monitoring method is used.
Figure 42:
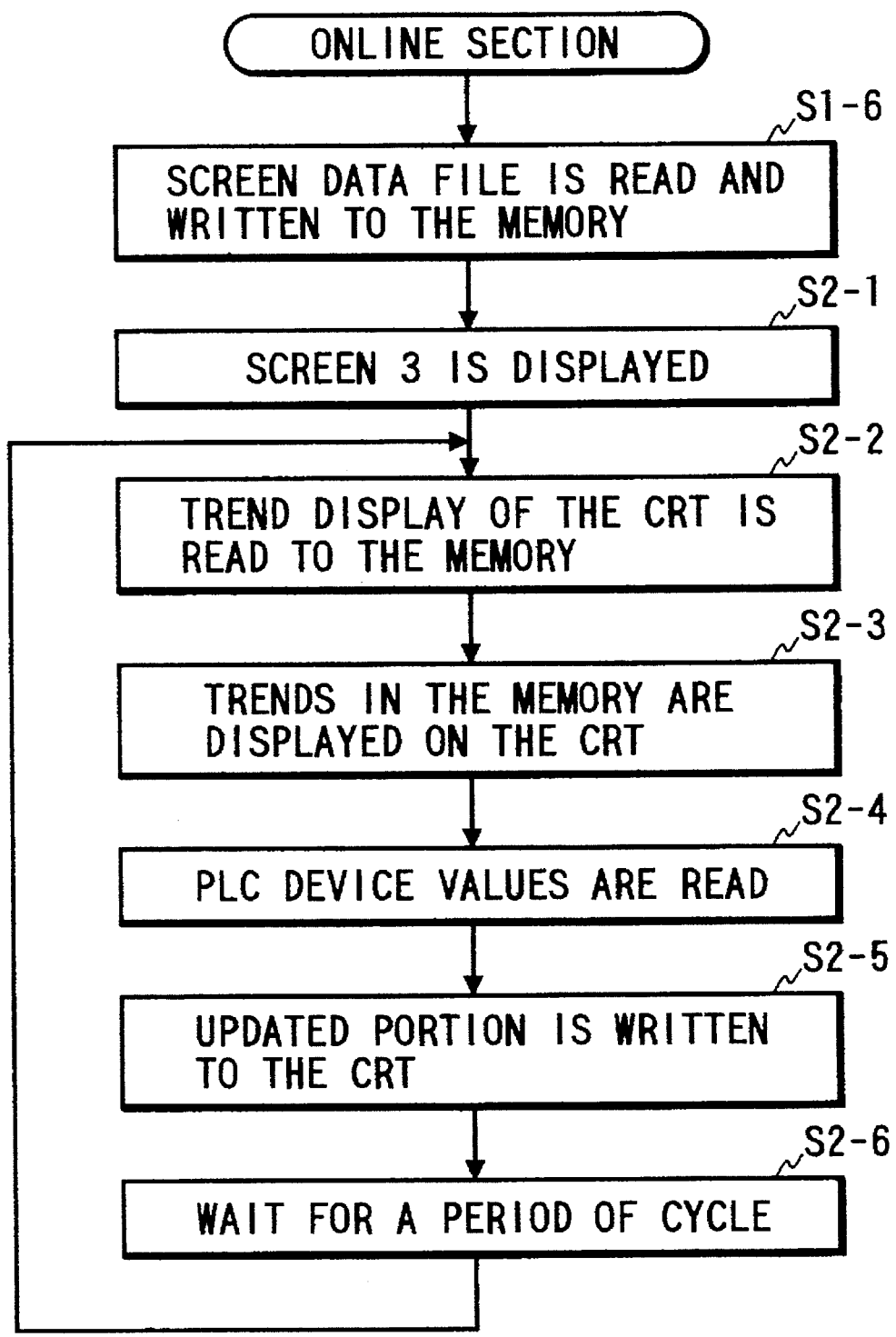
FIG. 42 is a flowchart showing the operation of the conventional monitoring method.
Figure 43:
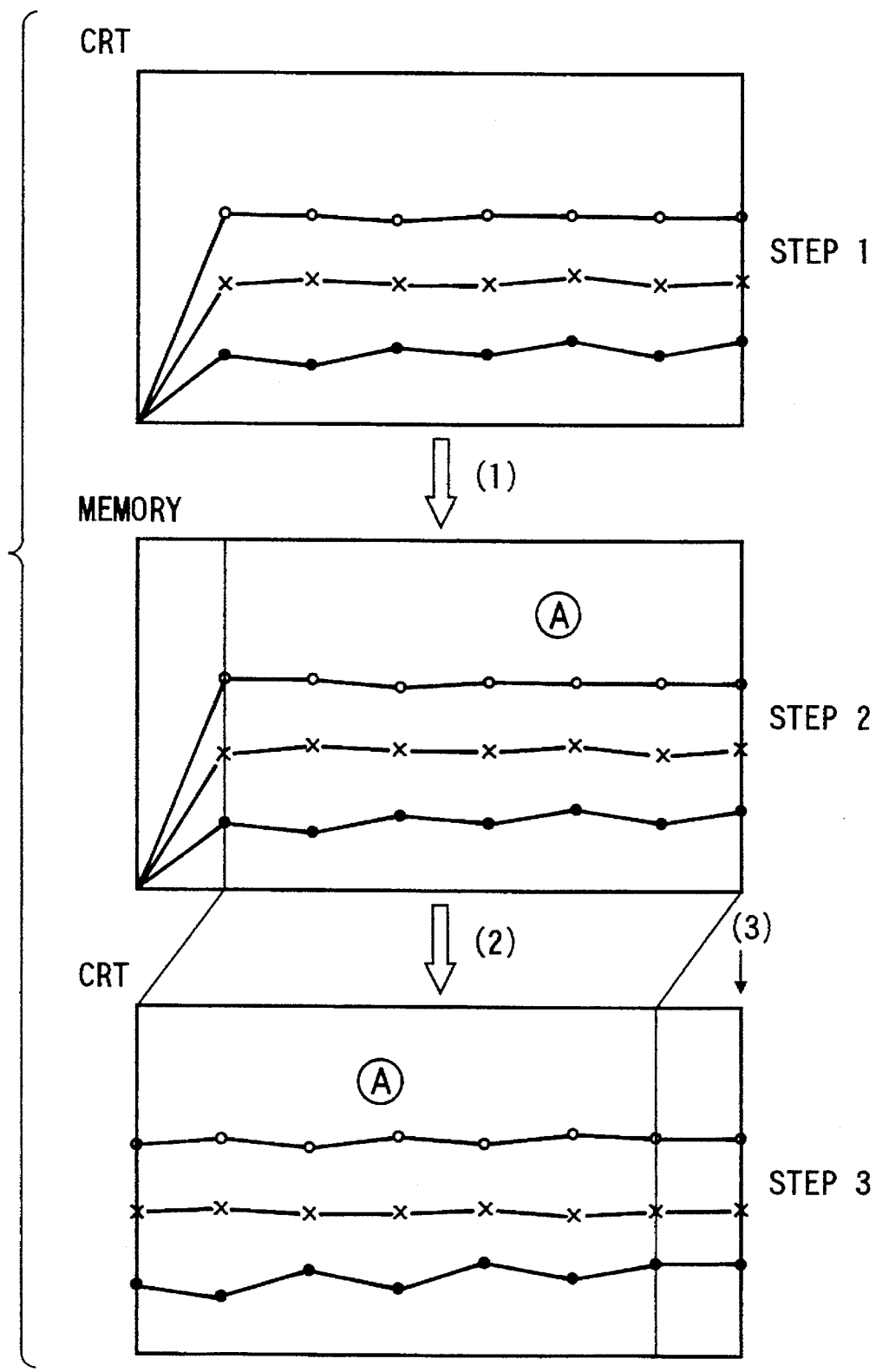
FIG. 43 is a diagram showing the processing of the monitor apparatus in which a conventional monitoring method is used.
Figure 44:
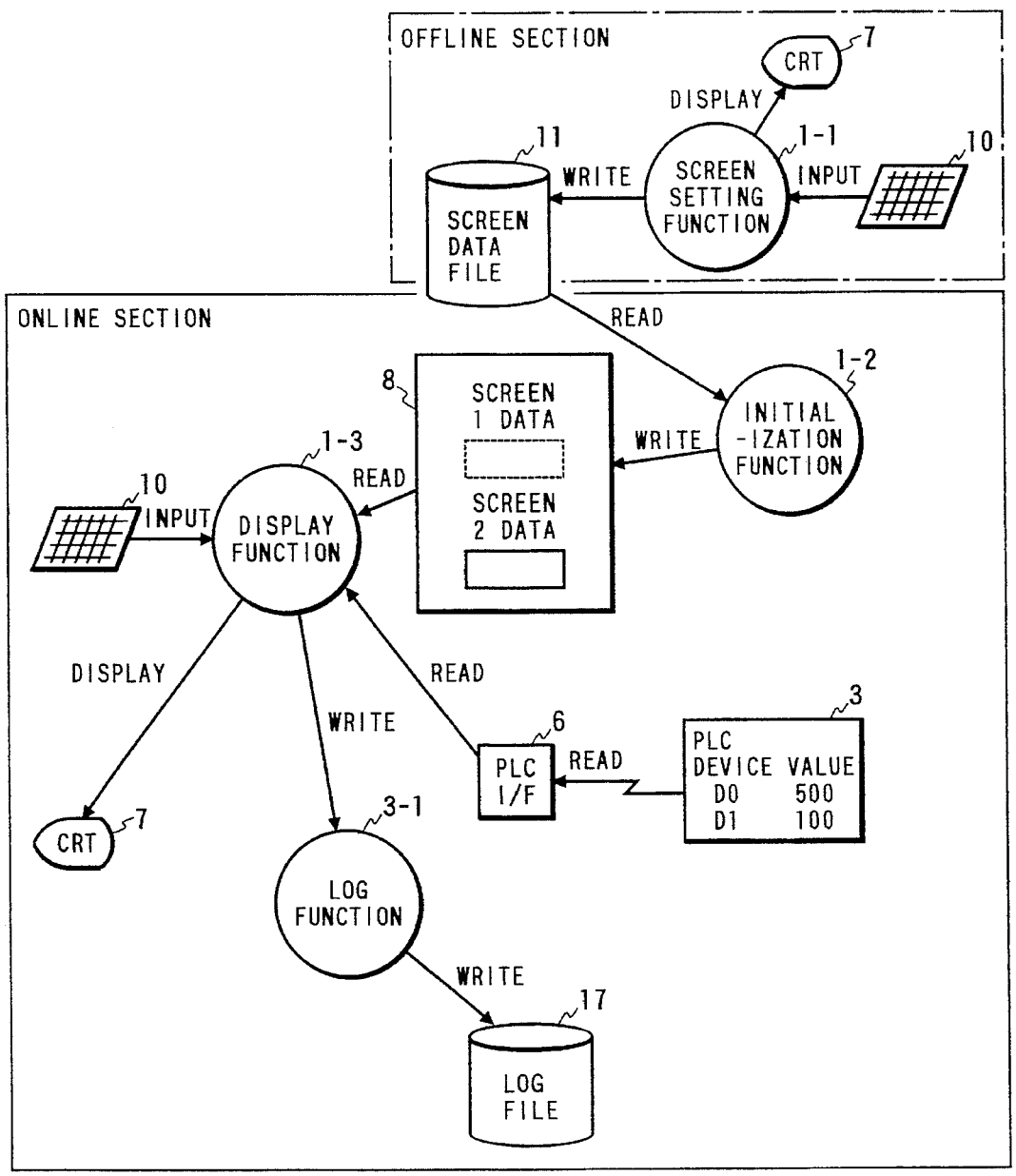
FIG. 44 is a functional diagram of the monitor apparatus in which a conventional monitoring method is used.
Figure 46:
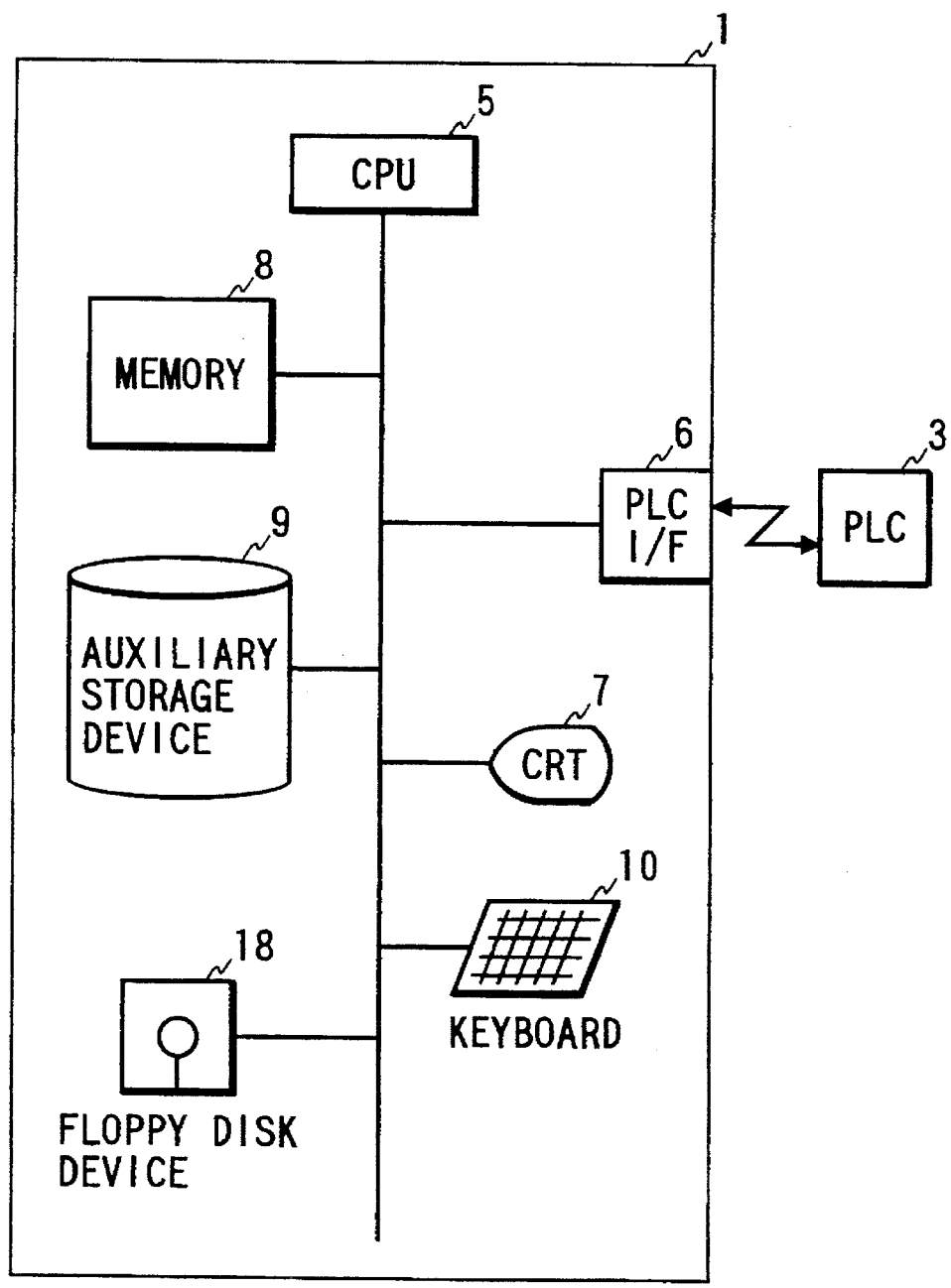
FIG. 46 is a block diagram showing the diagrammatic configuration of a monitor apparatus in which a conventional monitoring method is used.
Figure 47:
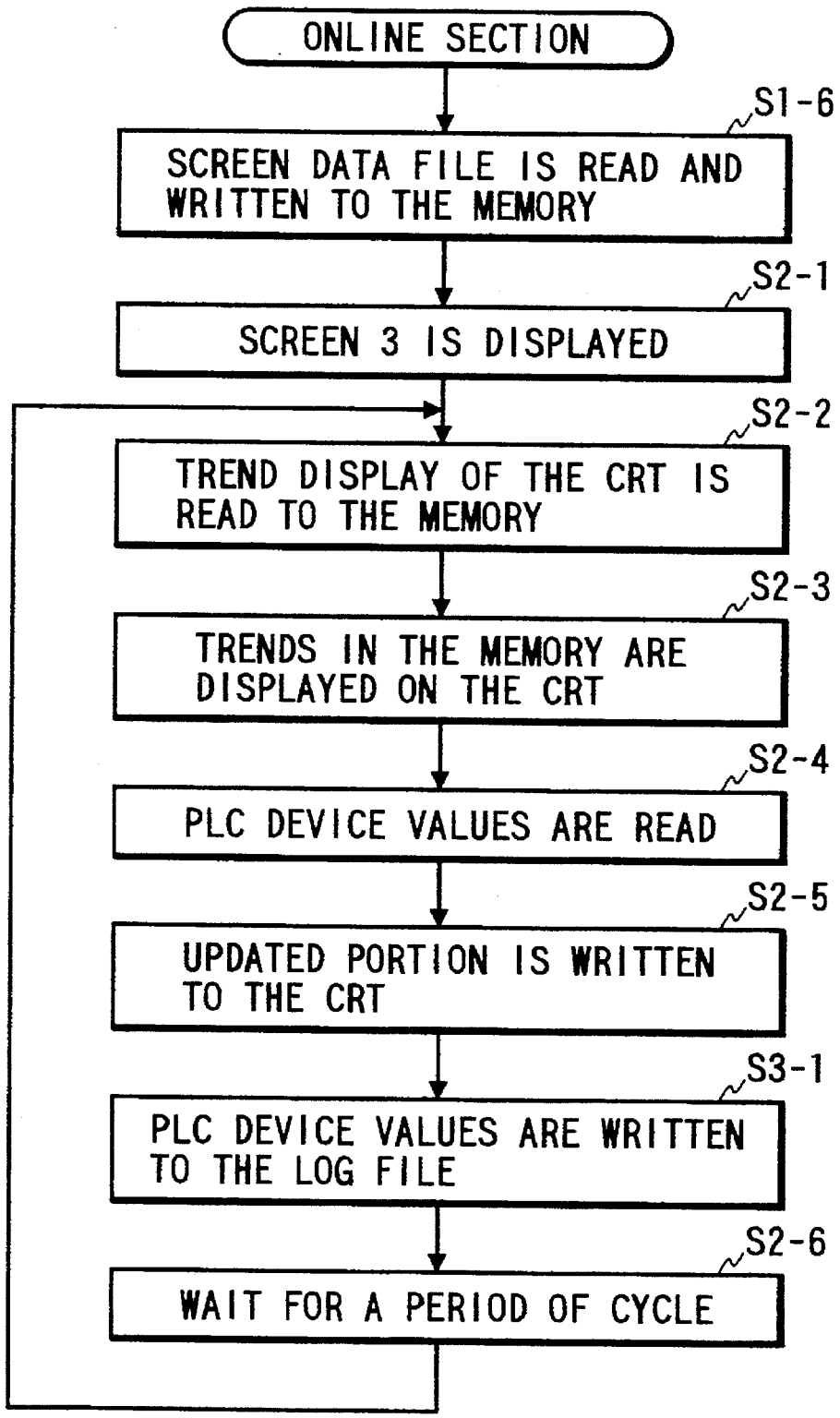
FIG. 47 is a flowchart showing the operation of the conventional monitoring method.
Figure 49:
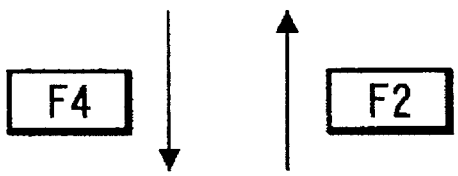
FIG. 49 is a diagram showing conventional screens 1 and 4.
Figure 50:
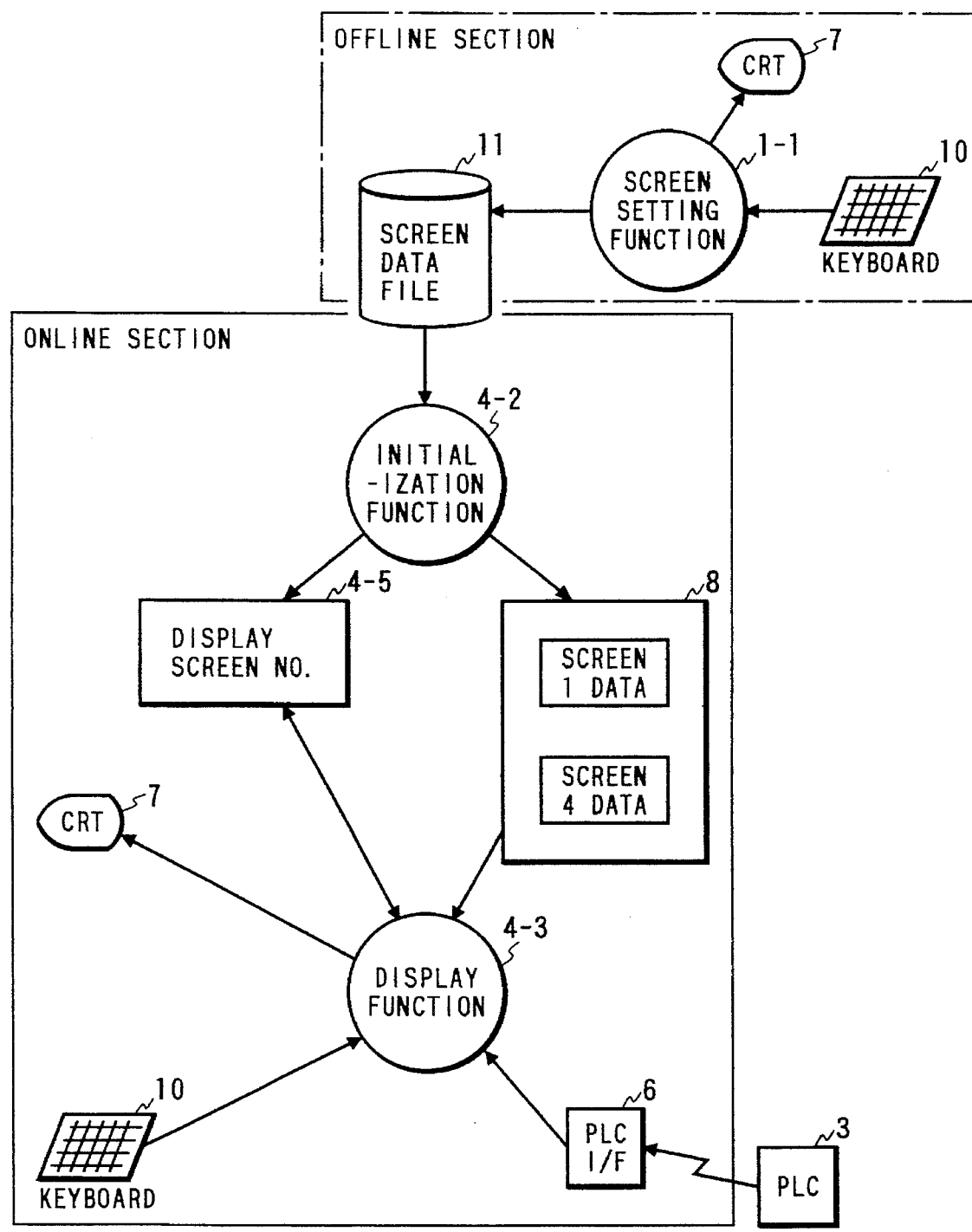
FIG. 50 is a functional diagram of the monitor apparatus in which a conventional monitoring method is used.

FIG. 4 is a flowchart showing the initialization function 1-2, the display function 1-3, the sub-PLC setting function 1-4 and the device reading function 1-6. Steps S1-6, S1-7 and S1-9 to S1-12 are the same as in the conventional example shown in FIG. 37, and will not be described here.

At step S1-13, devices to be read from the PLC 3 and process setting are retrieved from the screen data of the memory 14, and the values of the retrieved devices are set in the device registration area 161 of the two-port memory 16. At step S1-14, the device values in the device value area of the two-port memory 16 are read. Step S1-13 is executed by the sub-CPU setting function 1-4, and step S1-14 is executed by the device reading function 1-6.

Figure 5:
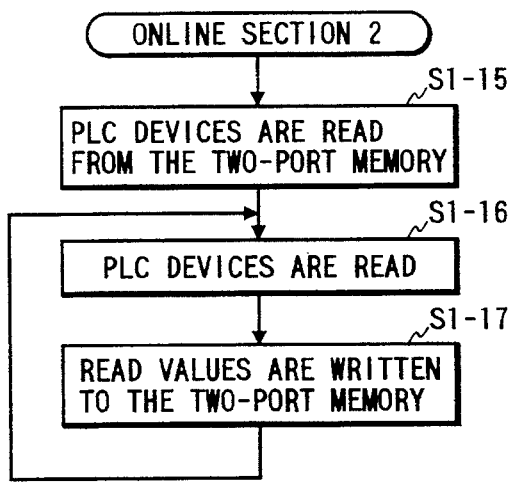
FIG. 5 is a flowchart showing a further operation of the monitoring method according to the first embodiment of the present invention.

FIG. 5 is a flowchart showing the PLC reading function 1-5. At step S1-15, the PLC devices set in the device registration area of the two-port memory 16 are read. At step S1-16, the values of the set devices are read from the PLC 3 via the PLC interface 6. Both steps S1-15 and S1-16 are executed by the PLC reading function 1-5. At step S1-17, the values read from the PLC 3 are written to the device value area 162 of the two-port memory 16. If process setting has been performed, a calculation is made and the result of calculation is written.

The online section 2, shown in FIG. 3, is controlled so as to repeatedly execute the operation shown in FIG. 5 independently of the operation of the online section 1, also shown in FIG. 3. Moreover, the online section 1 is controlled so as to execute the operation shown in FIG. 4 independently of the operation of the online section 2. Hence, the online section 2 allows the contents written to the two-port memory 16 to be displayed on the CRT 7 of the online section 1. Therefore, there is no delay in the display due to, for example, a wait state condition which occurs until reading of the PLC is completed by the operation of the online section 1.

Accordingly, in this embodiment of the present invention, the PLC devices are read and the process setting is calculated by the CPU 13 to reduce the load of the CPU 12. For example, the CPU 13 carries out approximately 2.2-seconds of processing to read 40 PLC devices, and the CPU 12 only reads the values of the PLC devices from the two-port memory 16 (concurrently) in 0.04 ms according to the following equation:

$$0.001 \text{ ms} \times 40 \text{ devices} = 0.04 \text{ ms}$$

wherein 0.001 ms is a period of time to read one section of data from the two-port memory.

Hence, the time in which the system responds to the pressing of a key is reduced, and thus, the operability of the system is improved. Further, since the display process of the static screen is executed simultaneously with the reading operation of the PLC, displaying of the monitor screen is performed at high speed.

A second embodiment of the present invention will now be described.

Figure 6:
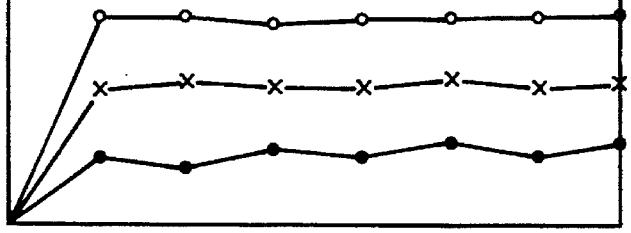
FIG. 6 is a diagram showing a two-port memory according to a second embodiment of the present invention.

FIG. 6 shows another example of the two-port memory 116. As shown in this figure, the two-port memory 116 has a trend registration area 117, a trend area 118 and a starting point area 119. In the trend registration area 117, trends which the CPU 12 requests the CPU 13 to read are registered. In the setting of the two-port memory 116, D2, D3 and D4 are read at intervals of 10 seconds. In the trend area 118, the values of the PLC devices read by the CPU 13 from the PLC 3 via the PLC interface 6 are written in the image to be displayed on the CRT 7.

Figure 7:
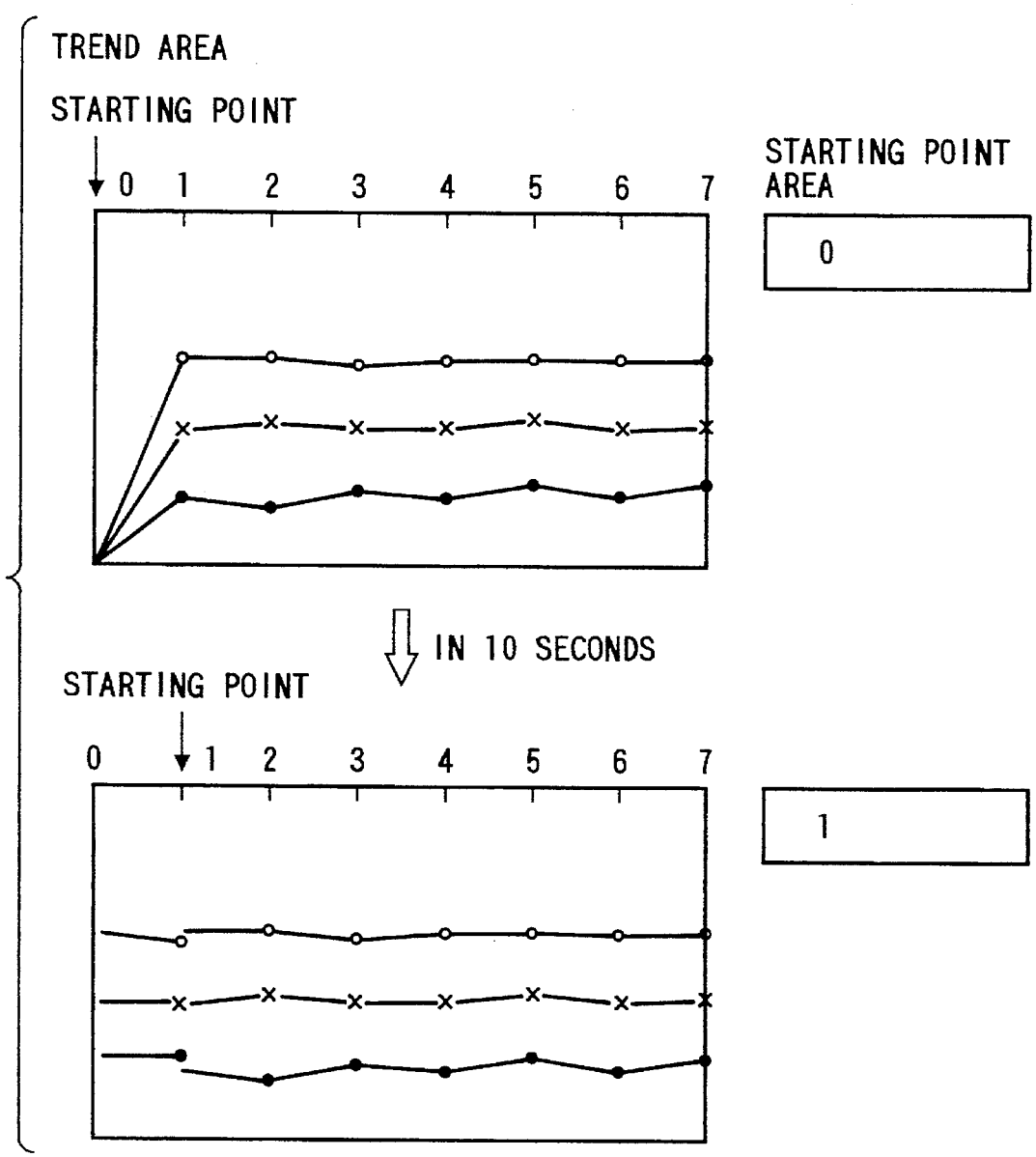
FIG. 7 is a diagram showing the processing of a monitor apparatus in which the monitoring method according to the second embodiment of the present invention is used.

In the starting point area 119, the transfer source of the trend area 118 is indicated by the CPU 12. For instance, if "0" is in the starting point area in FIG. 7, the CPU 12 points to the CRT 7, beginning with the starting point "0" of the trend area 118. In 10 seconds, the CPU 13 updates the starting point from "0" to "1" to increment the starting point area to "1". The CPU 12 writes the starting points "1" to "7" of the trend area 118 to the CRT 7 and then writes "0" to "1" to the CRT 7. The number of starting points is equal to the number of points in the trend registration area 117, which is "0" to "7" in this example.

Figure 8:
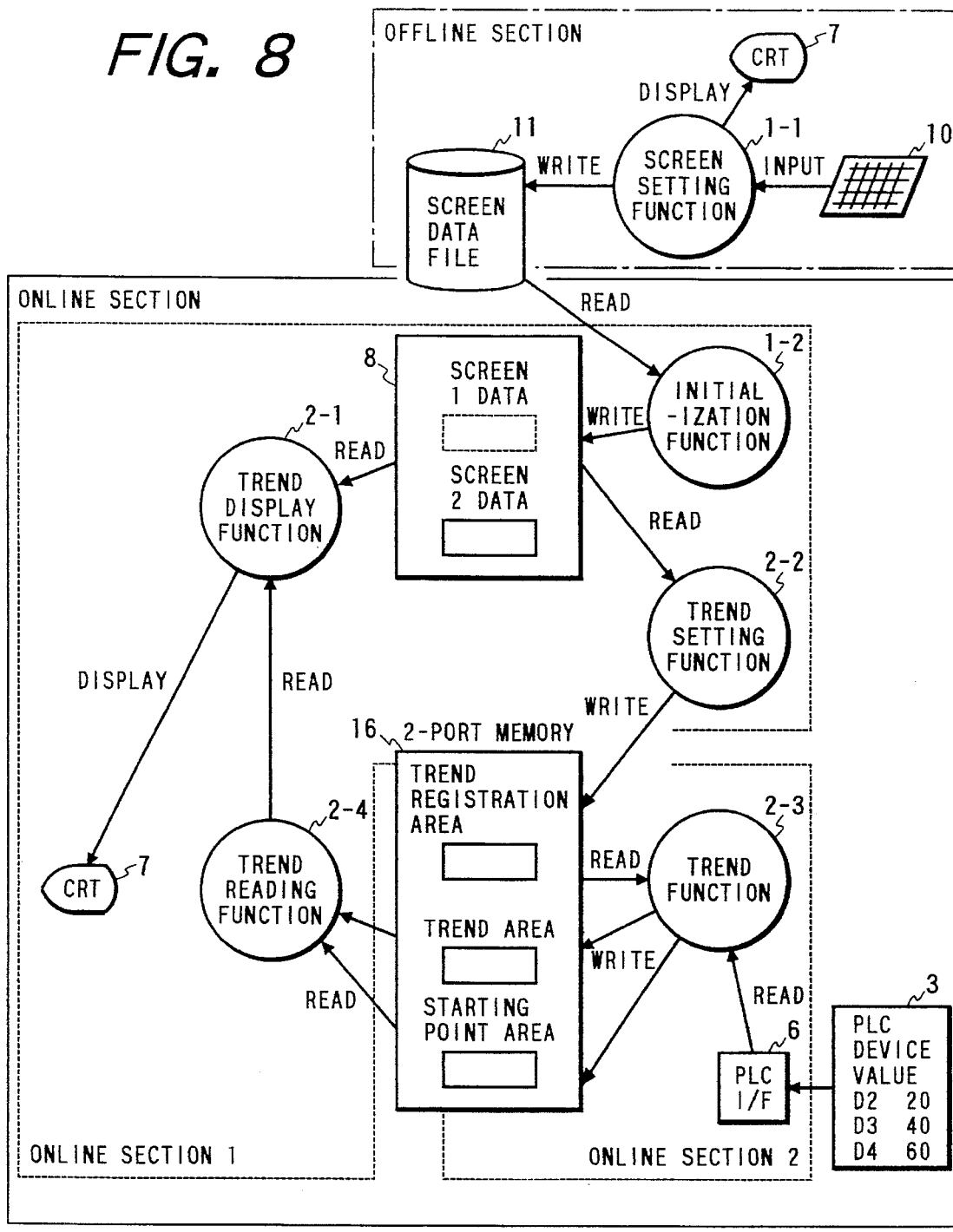
FIG. 8 is a functional diagram of the monitoring method according to the second embodiment of the present invention.

FIG. 8 is a block diagram showing the operation of the monitor apparatus in which the monitoring method of the second embodiment is used. A trend setting function 2-2 retrieves trends from the screen data of the memory 8, and writes the setting of the retrieved trends to the trend registration area 117 of the two-port memory 16. A trend function 2-3 reads the PLC devices set in the trend setting area of the two-port memory 116 from the PLC 3 via the PLC interface 6, and writes them to the trend area 118 and starting point area 119 of the two-port memory 116. A trend reading function 2-4 reads trends from the trend area 118 indicated in the starting point area 119 of the two-port memory 116 and transfers them to the trend display function 2-1.

The trend setting function 2-2 and the trend reading function 2-4 are constituted by the programs in the memory 14 and executed by the CPU 12. The trend function 2-3 is constituted by the program in the memory 15 and executed by the CPU 13.

FIG. 9 is a flowchart showing the initialization function 1-2, the trend setting function 2-2, the trend display function 2-1 and the trend reading function 2-4. Step S1-6 is the same as in the first embodiment.

At step S2-7, trends are retrieved from the screen data of the memory 8 and the setting of the retrieved trends is written to the trend registration area 117 of the two-port memory 116. At step S2-1, screen 3 is displayed.

At step S2-8, the trends are read from the trend area indicated in the starting point area of the two-port memory 16 and are displayed on the CRT 7.

Step S2-7 is executed by the trend setting function 2-2 and Step S2-8 is executed by the trend display function 2-1 and the trend reading function 2-4.

FIG. 10 is a flowchart showing the trend function 2-3. At step S2-9, the values set in the trend setting area 117 of the two-port memory 116 are read. At step S2-10, the PLC devices set are read from the PLC 3 via the PLC interface 6.

At step S2-11, the values read from the PLC 3 to the trend area 118 of the two-port memory 116 are written in an image to be displayed on the CRT 7. At step S2-12, the starting point area of the two-port memory 16 is incremented by 1. At step S2-13, after a period of one cycle has passed, the above operation is repeated, starting from step S2-10. Steps S2-9 to S2-13 are executed by the trend function.

This second embodiment achieves the following results. Namely, the CPU 13 reads the PLC devices and processes the trends to reduce the load of the CPU 12. For instance, when the trends of 10 PLC devices are displayed, the processing time of the CPU 12 is 0.3 seconds and that of the CPU 13 is 0.51 seconds, as illustrated by the following:

Processing time of CPU 12 = Writing time from two-port memory to CRT = 300 ms
Processing time of CPU 13 = (Reading time of 10 PLC devices) + (Processing time of update portion)
   = 500 ms + 10 ms
   = 510 ms Hence, trends can be displayed at intervals of about one second or less.

A third embodiment of the present invention will now be described.

Figure 11:
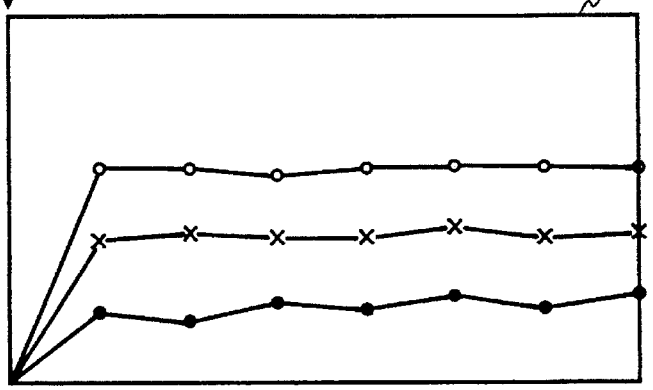
FIG. 11 is a diagram showing a two-port memory according to a third embodiment of the present invention.

FIG. 11 shows an example of a two-port memory 216, which has a trend registration area 217, a trend area 218, a starting point area 219, a trend value area 220 and a trend value flag 221. In the trend value area, the values of PLC devices read by the CPU 13 from the PLC 3 via the PLC interface 6 are written. The CPU 12 reads these values and writes them to the log file 17 (see FIG. 14).

Figure 12:
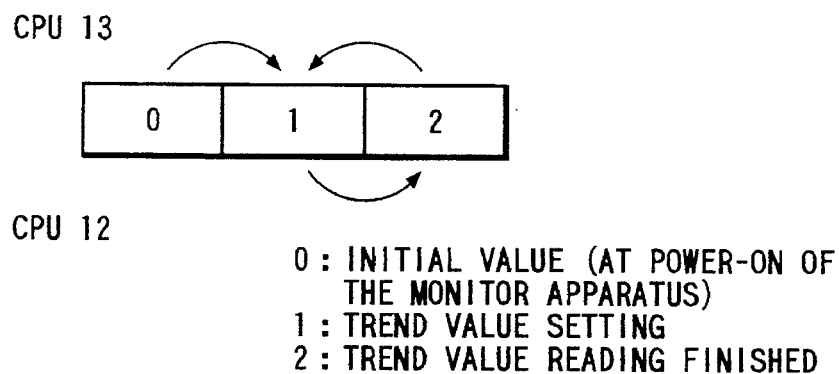
FIG. 12 is a diagram showing the transition of a trend value flag according to the third embodiment of the present invention.

The trend value flag 221 is used by the CPU 13 and the CPU 12 to access the trend value area. In the trend value flag 221, transition takes place as shown in FIG. 12, for example, when the CPU 13 writes PLC device values to the trend value area 220, it writes 1 to the trend value flag 221. If the flag value is 1, the CPU 12 reads the values from the trend value area 220 and writes 2 to the trend value flag 221.

Figure 13:
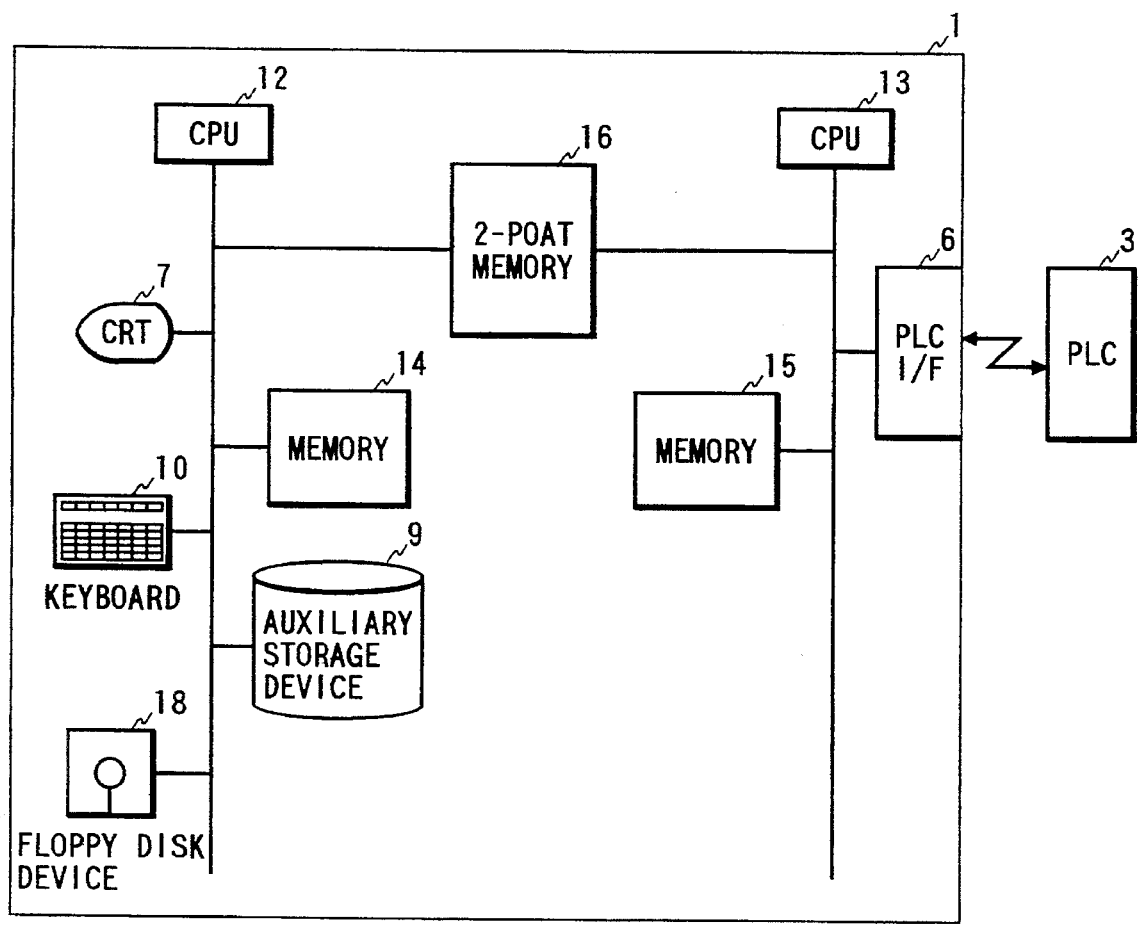
FIG. 13 is a block diagram of a monitor apparatus in which the monitoring method according to the third embodiment of the present invention is used.

FIG. 13 is a block diagram of a monitor apparatus in which the monitoring method according to the third embodiment of the present invention is used.

Figure 14:
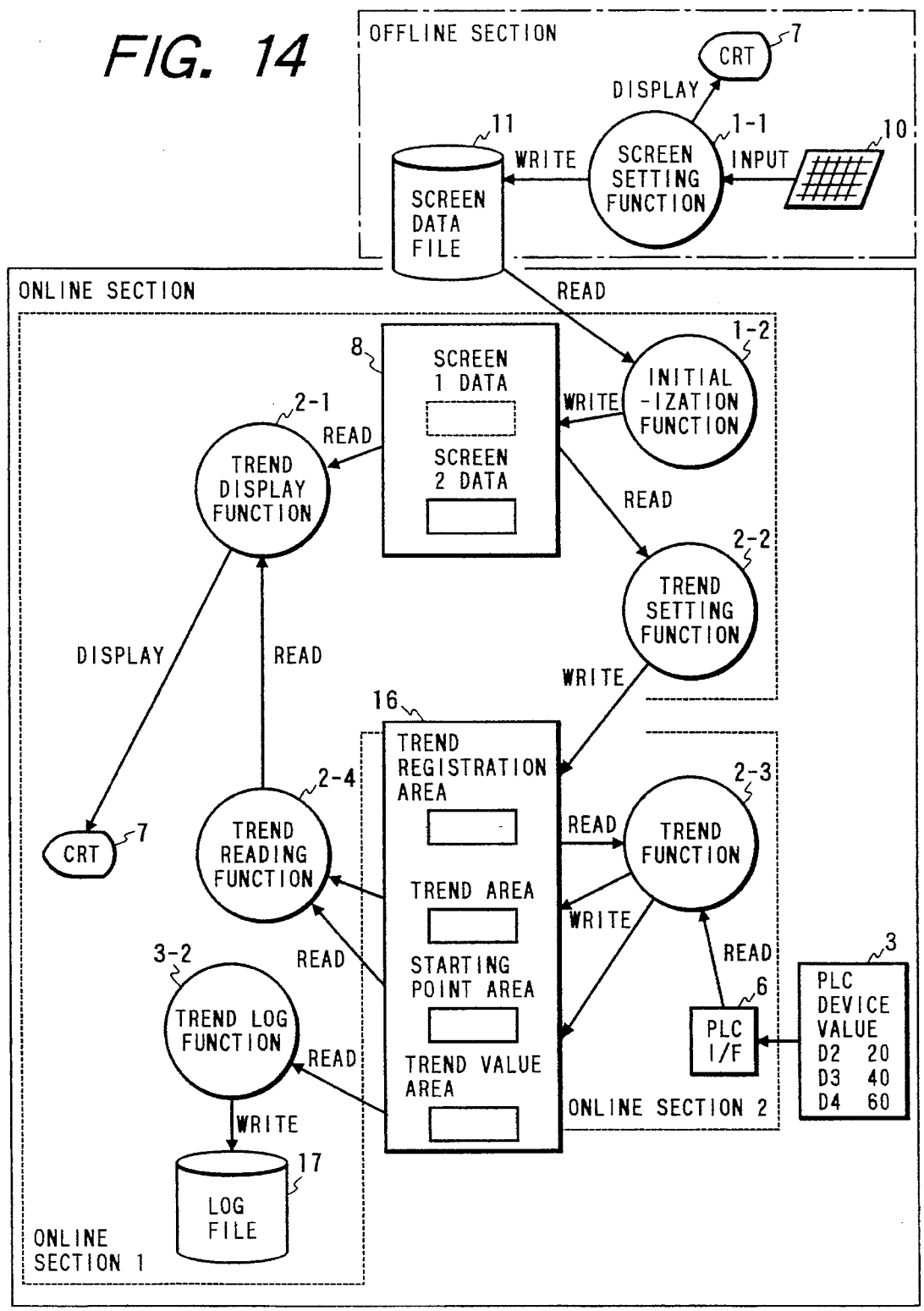
FIG. 14 is a functional diagram of the monitor apparatus in which the monitoring method according to the third embodiment is used.

FIG. 14 is a block diagram showing the operation of the monitor apparatus in which the monitoring method of the third embodiment is used. A trend log function 3-2 reads PLC device values from the trend value area 220 of the two-port memory 216 and writes them to the log file 17.

The trend log function 3-2 is constituted by the program in the memory 14 and executed by the CPU 12.

Figure 15:
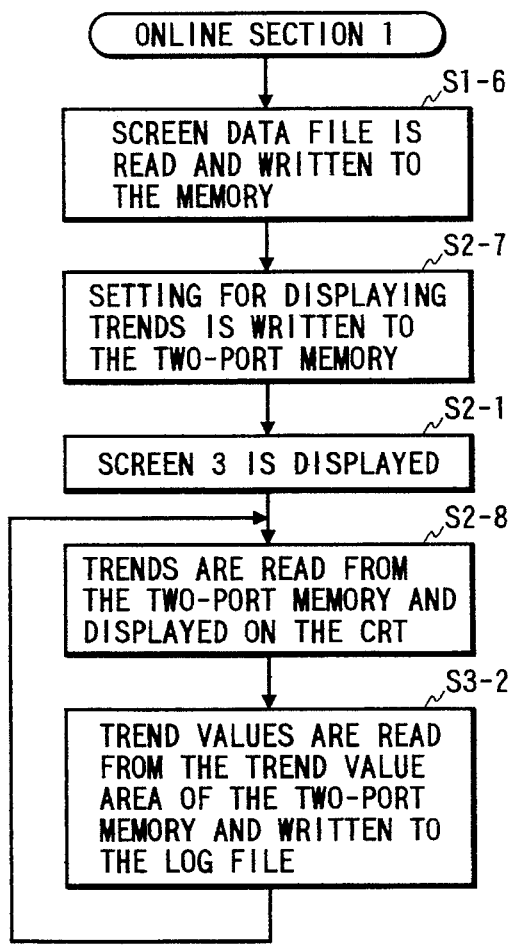
FIG. 15 is a flowchart showing the operation of the monitoring method according to the third embodiment of the present invention.

FIG. 15 is a flowchart showing the initialization function 1-2, the trend setting function 2-2, the trend display function 2-1, the trend reading function 2-4 and the trend log function 3-2.

Steps S1-6 to S2-8 are the same as in the second embodiment of the present invention. At step S3-2, if the setting of the trend value flag 221 is 1, values are read from the trend value area 220 and written to the log file 17, and the trend value flag 221 is set to 2. Step S3-2 is executed by the trend log function 3-2.

Figure 16:
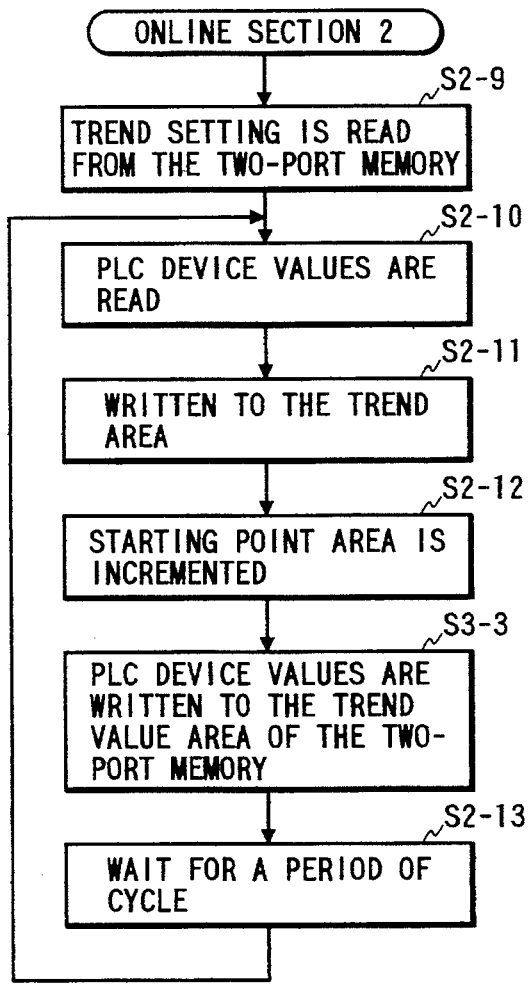
FIG. 16 is a flowchart showing a further operation of the monitoring method according to the third embodiment of the present invention.

FIG. 16 is a flowchart showing the trend log function 3-2. Steps S2-9 to S2-12 and S2-13 are the same as in the second embodiment.

At step S3-3, if the trend value flag is 0 or 2, PLC device values and time-of-day are written to the trend value area 220 and the trend value flag 221 is set to 1. Step S3-3 is executed by the trend function 3-2.

The third embodiment of the present invention achieves the following results. Namely, the CPU 13 reads the PLC devices and processes the trends to reduce the load of the CPU 12. For example, when the trends of 10 PLC devices are displayed, the processing time of the CPU 12 is 0.8 seconds and that of the CPU 13 is 0.51 seconds, as illustrated by the following:

CPU 12 Time = (memory-to-CRT write time) + (time to write to log file)
= 300 + 500
= 800 ms
CPU 13 Time = 510 ms Hence, trends can be displayed at intervals of about one second or less.

Figure 17:
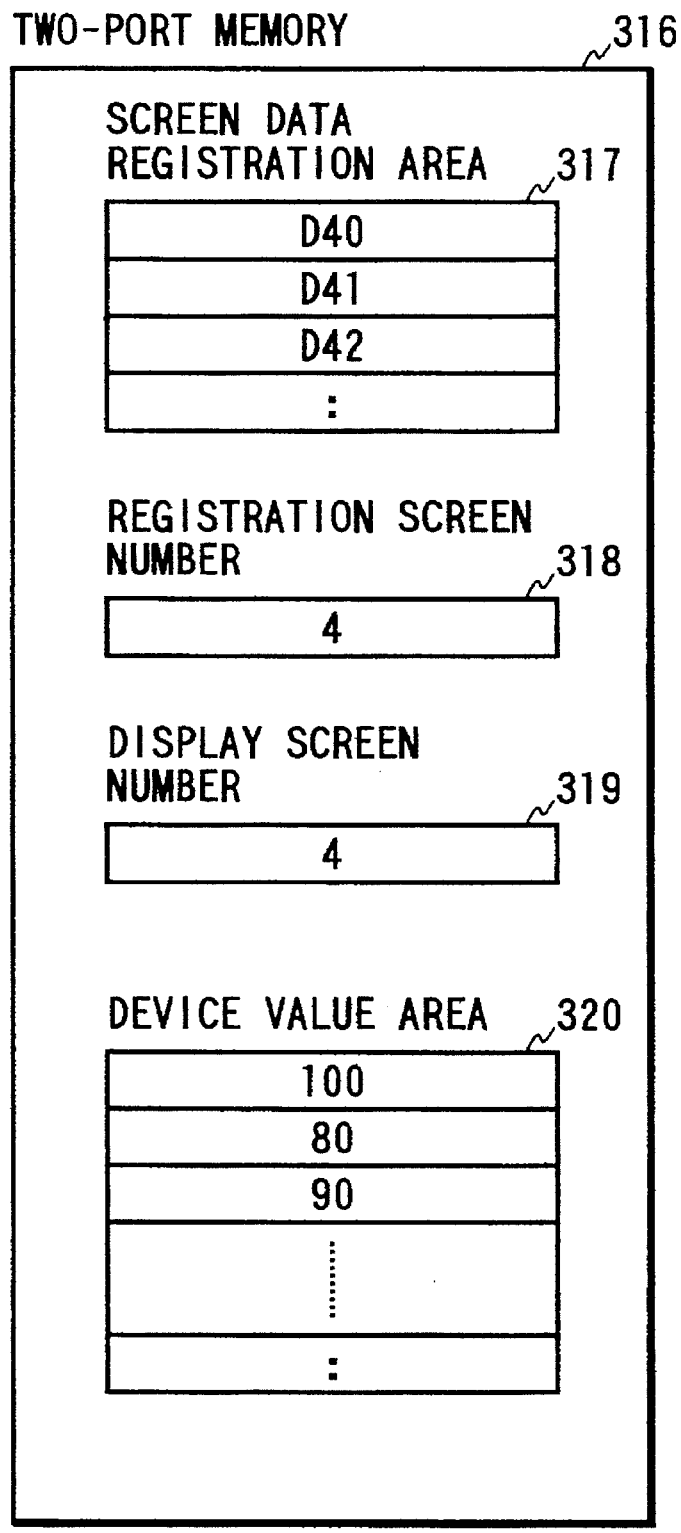
FIG. 17 is a diagram showing a two-port memory according to a fourth embodiment of the present invention.

FIG. 17 shows an example of the two-port memory 316. As shown in the figure, the two-port memory 316 has a screen data registration area 317, a device value area 318, a display screen number area 319 and a registration screen number setting area 320.

In the screen data registration area 317, the CPU 12 registers PLC device setting in the screen data to the CPU 13 on a screen basis, and in the registration screen number setting area 320, a screen number for PLC device setting registered in the screen data registration area is set. In FIG. 17, D40, D41 and D42 have been set as the PLC device setting of screen 4, and the CPU 13 (sub-CPU) uses the screen data registration function 4-7 to register that setting to the memory 15 as the data of screen 4.

In the device value area 318, the values of the PLC devices on the screen set in the display screen number, which have been read from the PLC 3 via the PLC interface 6 by the PLC reading function 4-6, are written by the CPU 13. Since screen 4 has been set to the display screen number in FIG. 17, values 100, 80 and 90 read from PLC devices D40, D41 and D42 have been written.

Figure 18:
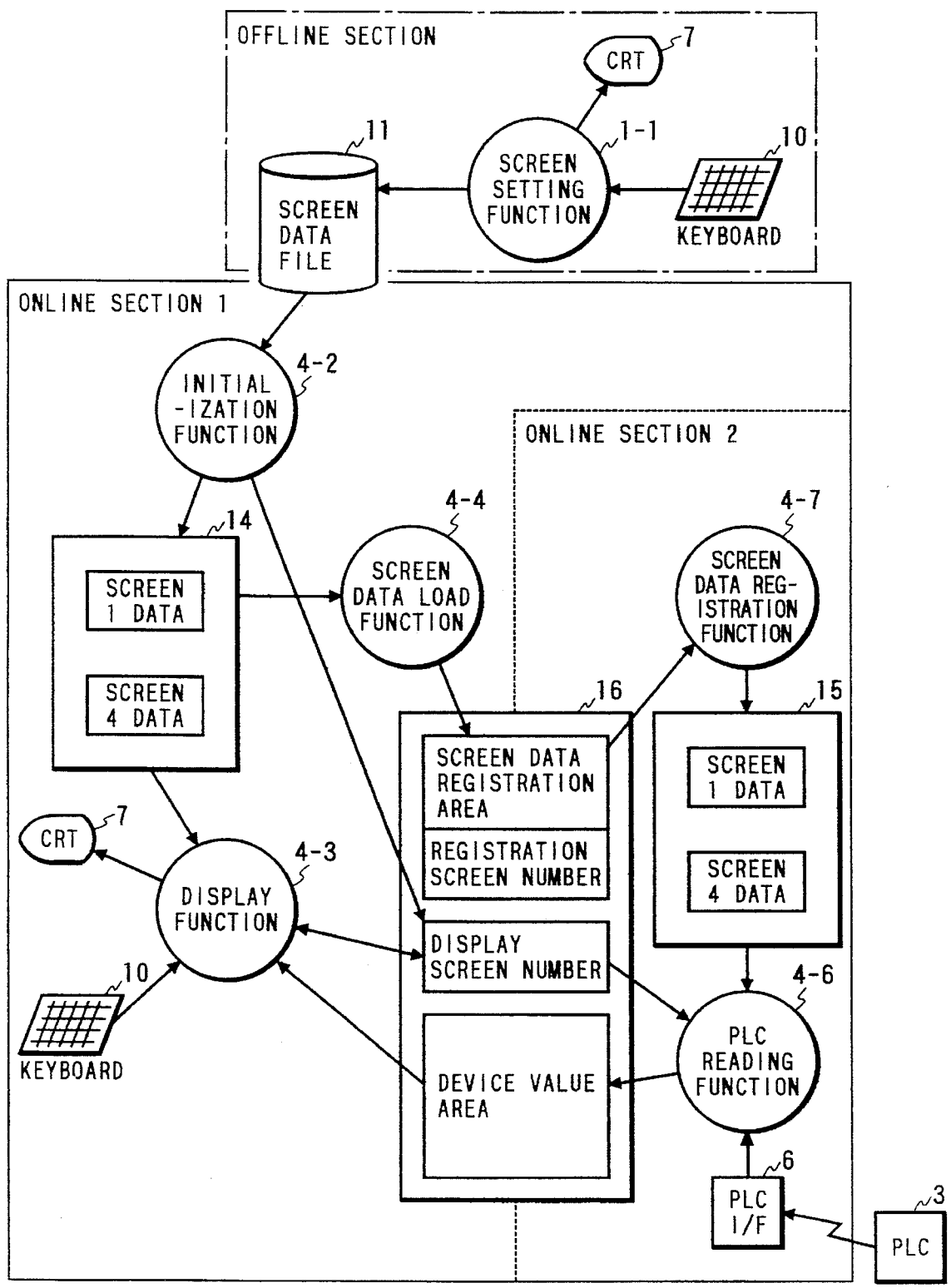
FIG. 18 is a functional diagram of a monitor apparatus in which the monitoring method according to the fourth embodiment of the present invention is used.

FIG. 18 is a block diagram showing the operation of the monitor apparatus which uses the monitoring method of the fourth embodiment. A screen data load function 4-4 repeats the operation of reading the PLC device set portion of animation display data for one screen from the screen data in the memory 14, writes it to the screen data registration area 317 of the two-port memory 316, and sets the write destination screen number to the registration screen number setting area 320 of the two-port memory 316. This operation is repeated for the number of screens registered to the screen data in the memory 14.

A screen data registration function 4-7 registers to the memory 15 the PLC device setting written in the screen data registration area 317 of the two-port memory 316 as the data of the screen number set in the registration screen number setting area 320. A PLC reading function 4-6 reads from the memory 15 the PLC device the screen set in the display screen number area 319, reads device values from the PLC via the PLC interface 6, and writes them to the device value area 318.

The initialization function 4-2, the display function 4-3 and the screen data load function 4-4 are constituted by the programs in the memory 14 and executed by the CPU 12. The screen data registration function 4-7 and the PLC reading function 4-6 are constituted by the programs in the memory 15 and executed by the CPU 13.

Figure 19:
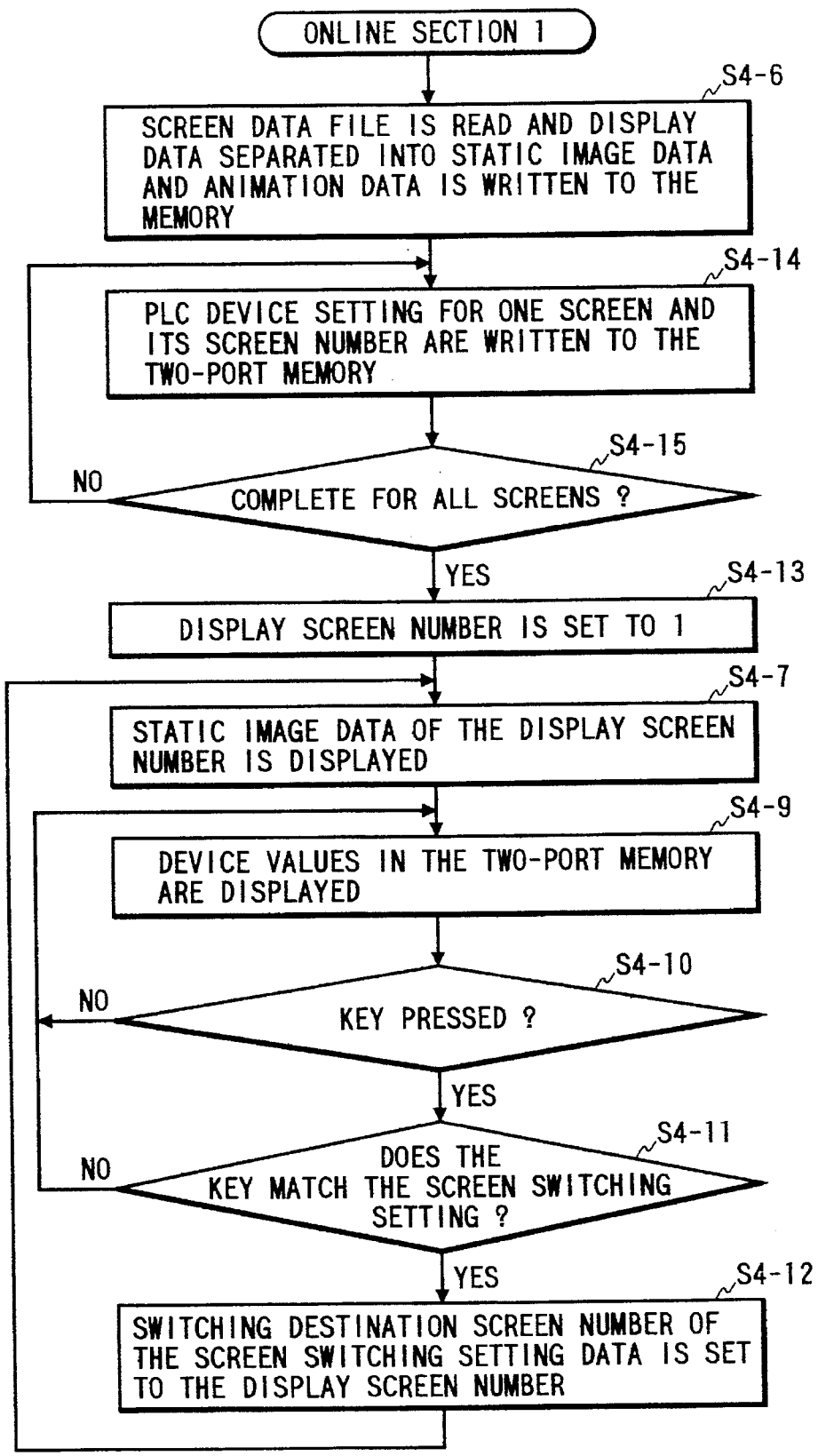
FIG. 19 is a flowchart showing the operation of the monitoring method according to the fourth embodiment of the present invention.

FIG. 19 is a flowchart showing the operations of the initialization function 4-2, the display function 4-3 and the screen data load function 4-4.

Figure 52:
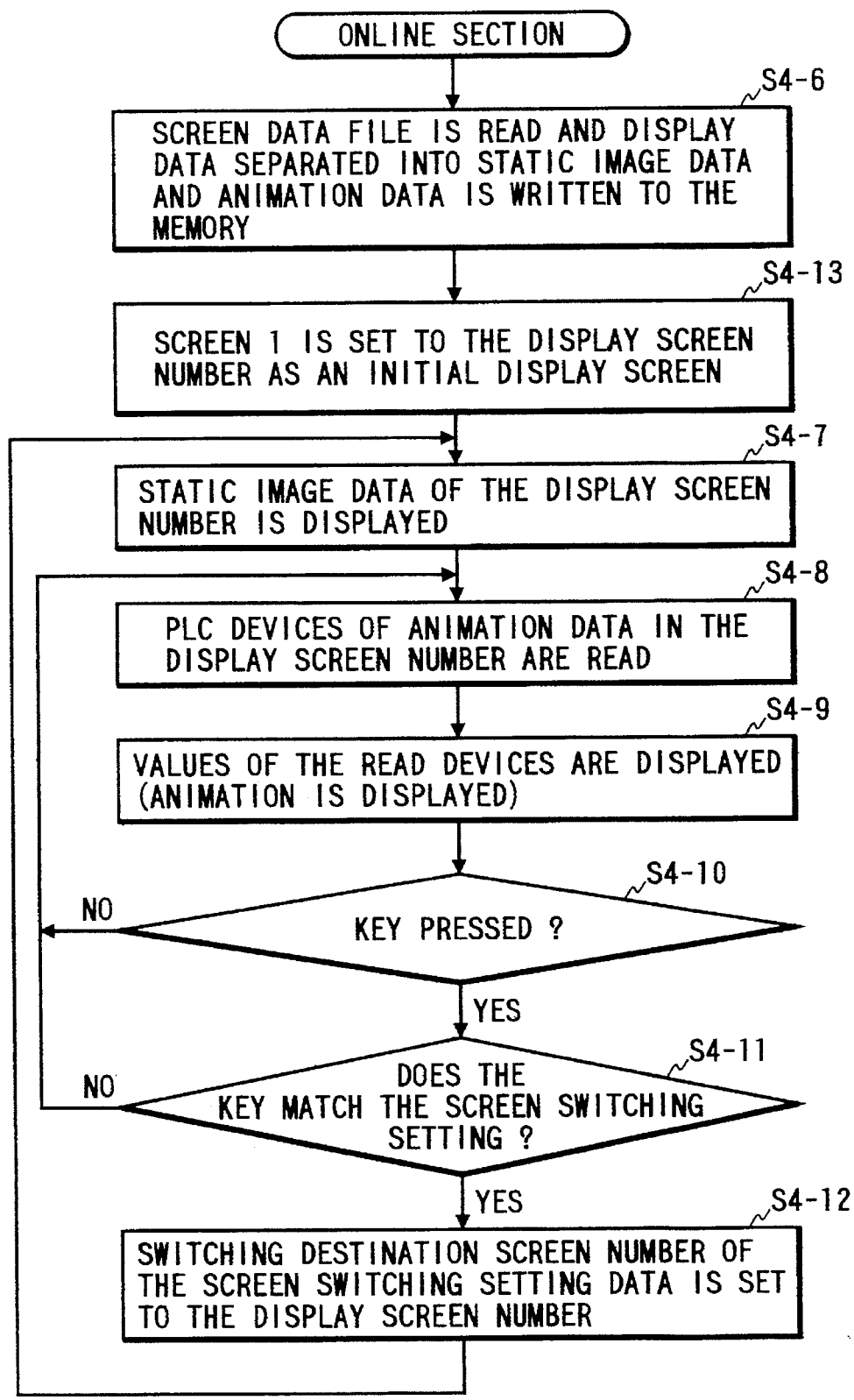
FIG. 52 is a flowchart showing the operation of the conventional monitoring method.

Steps S4-6, S4-13, S4-7, S4-10, S4-11 and S4-12 are identical to those in the conventional example shown in FIG. 52. At step S4-14, the PLC device setting for one screen is read from the animation display data in the screen data of the memory 14 and written to the screen data registration area 317 of the two-port memory 316. Also, the write destination screen number of the PLC device setting is set to the registration screen number setting area 320 of the two-port memory 316.

At step S4-15, it is checked whether the processing of step S4-14 has been performed for all screen data registered in the memory 14.

At step S4-9, the device values read to the device value area of the two-port memory 316 are displayed on the CRT 7. This processing is identical to that at S4-9 of the conventional example in FIG. 52, with the exception that the device values are fetched from the two-port memory 316.

Also, the setting of the display screen number performed at steps S4-13 and S4-12 is identical to that carried out at steps S4-13 and S4-12 of the conventional example in FIG. 52, with the exception that the display screen number is set to the two-port memory 316. Steps S4-6 and S4-13 are implemented by the initialization function 4-2. Steps S4-14 and S4-15 are executed by the screen data load function. Steps S4-7, S4-9, S4-10, S4-11 and S4-12 are executed by the display function 4-3.

Figures 20, 21:
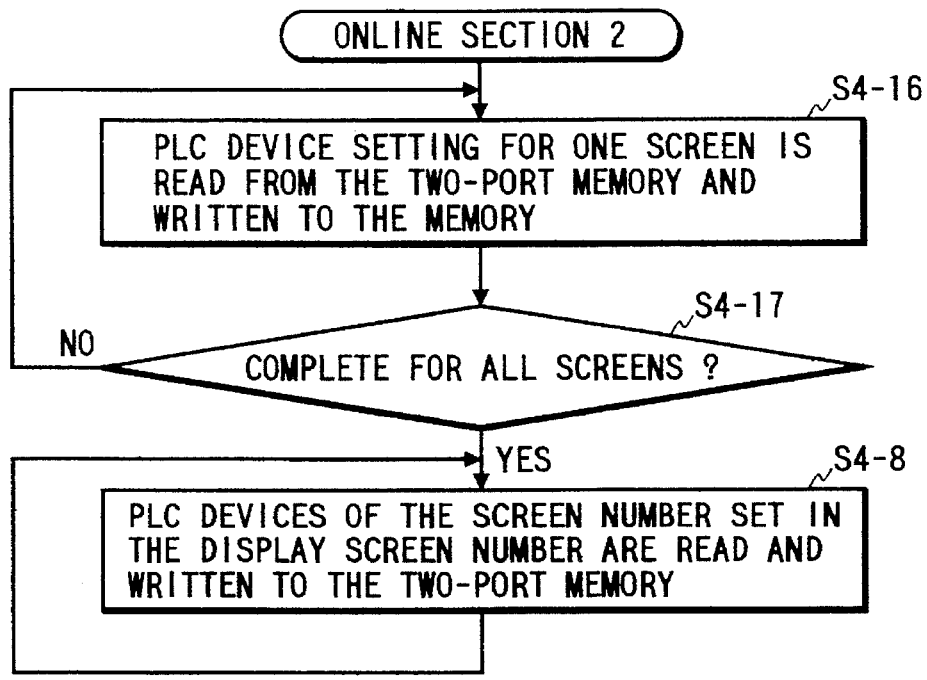
FIG. 20 is a flowchart showing a further operation of the monitoring method according to the fourth embodiment of the present invention.
FIG. 21 is a diagram showing device data according to the fourth embodiment of the present invention.

FIG. 20 is a flowchart showing the operations of the screen data registration function 4-7 and the PLC reading function 4-6. At step S4-16, the PLC device setting written in the screen data registration area of the two-port memory 316 are written to the memory 15 as the data of the screen in the registration screen number of the two-port memory 316.

At step S4-17, the processing of step S4-16 is repeated for all screen data.

An example of PLC device setting written to the memory 15 at steps S4-16 and S4-17 is shown in FIG. 21.

At step S4-8, the PLC device setting of the screen set to the display screen number of the two-port memory 316 is read from the memory 15, and the corresponding device values are read from the PLC 3 via the PLC interface 6 and written to the device value area 318 of the two-port memory 316. FIG. 21 is a diagram showing device data according to this embodiment.

Steps S4-16 and S4-17 are implemented by the screen data registration function 4-7. Step S4-8 is executed by the PLC reading function 4-6.

The present embodiment is different from the embodiments shown in FIGS. 2 and 3 in that the PLC device setting of all screen data has been registered in the CPU 13 and the display function 4-3 sets the display screen number to the two-port memory 16. Hence, the device values of the PLC device setting for one screen are written to the device value area of the two-port memory 316 by the PLC reading function 4-6.

The fourth embodiment of the present invention achieves the following results. Namely, the PLC devices are read by the CPU 13 to reduce the load of the CPU 12. Also, since only the PLC device value of the display screen number set in the two-port memory 316 is read from the PLC, the reading process of the PLC is performed at high speed, and the PLC device setting of all screens is registered to the memory 15. Therefore, when one screen is switched to another, the PLC reading function 4-6 of the CPU 13 reads the PLC devices and sets them to the two-port memory 316, while the display function 4-3 of the CPU 12 is outputting the static image display data to the CRT 7. Accordingly, all graphic elements are displayed at high speed after screen switching.

When screen data requires two seconds to display a static image, two seconds to read PLC devices, and one second to display animation, all graphic elements are displayed on the CRT 7 in five seconds after screen switching in the conventional system. However, the fourth embodiment of the present invention eliminates the two seconds of PLC device reading time, thus allowing all the graphic elements to be displayed in three seconds.

Figure 22:
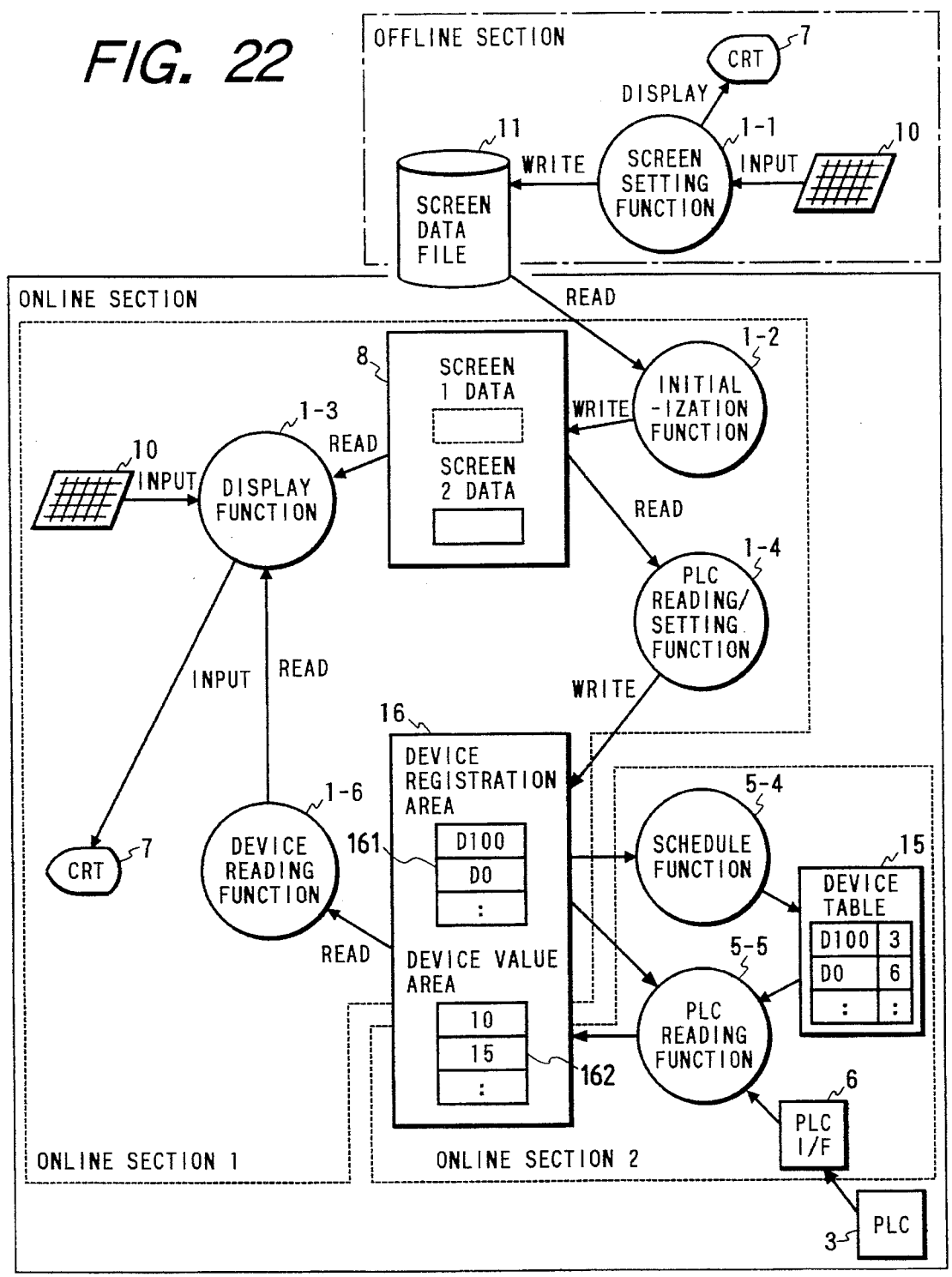
FIG. 22 is a functional diagram of a monitor apparatus in which the monitoring method according to a fifth embodiment of the present invention is used.

FIG. 22 is a block diagram showing the operation of the monitor apparatus to which the monitoring method of the embodiment is applied, wherein functions 1-1, 1-2, 1-3, 1-4 and 1-6 are identical to the functions having the same characters in FIG. 3. A schedule function 5-4 checks the setting of the device registration area 161 of the two-port memory 16 for consecutive devices or for devices falling within a predetermined range (within six points in the present embodiment), and registers them to the memory 15 as a device table in the form of a read request made to the PLC interface 6 (the first device+the number of points) so that they may be read in block at one time.

A PLC reading function 5-5 reads device values from the PLC 3 via the PLC interface 6 according to the device table registered in the memory 15, and writes the read values to the device value area in the order stored in the device registration area 161 of the two-port memory 16.

Figures 24, 25:
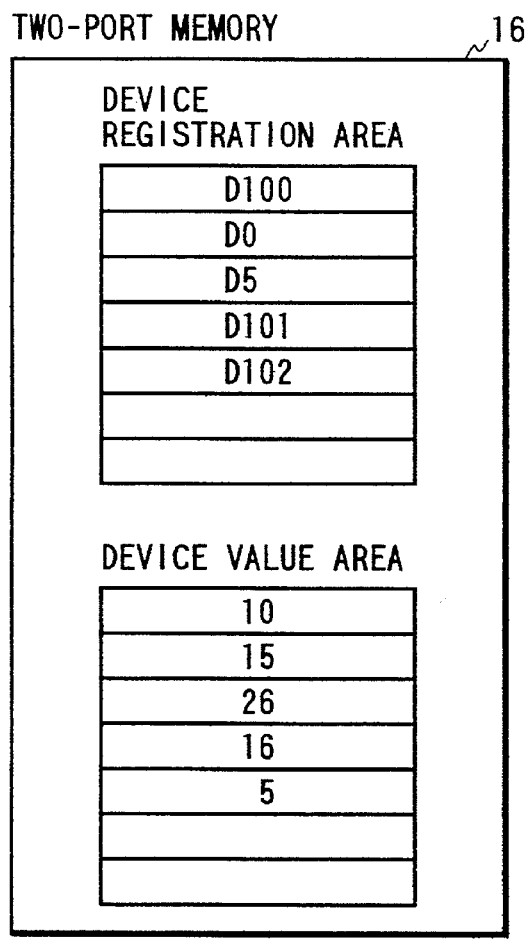
FIG. 24 is a diagram showing a two-port memory according to the fifth embodiment of the present invention.
FIG. 25 is a diagram showing a device table according to the fifth embodiment of the present invention.

The two-port memory 16 is set as shown in FIG. 24. The schedule function 5-4 reads this setting and creates the device table as shown in FIG. 25, so that three points are read beginning with D100 for the consecutive devices D100, D101 and D102, and six points are read beginning with D0 for the devices D0 and D5 falling within the range of six points.

Figures 53, 54:
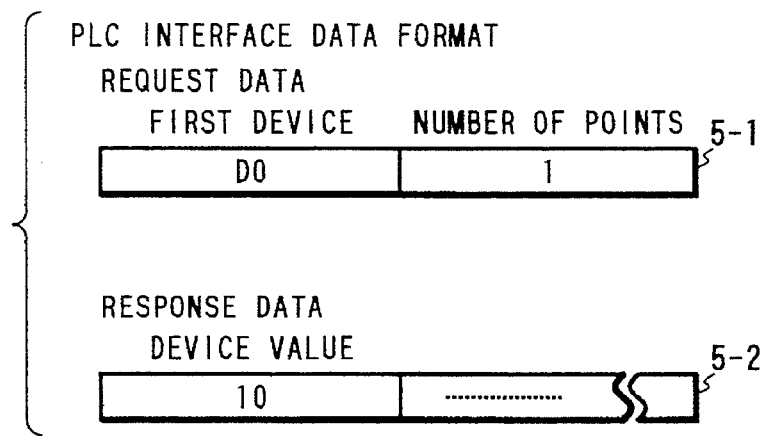
FIG. 53 is a diagram showing a conventional PLC interface data format.
FIG. 54 is a diagram showing conventional screen data.
Figures 55, 56:
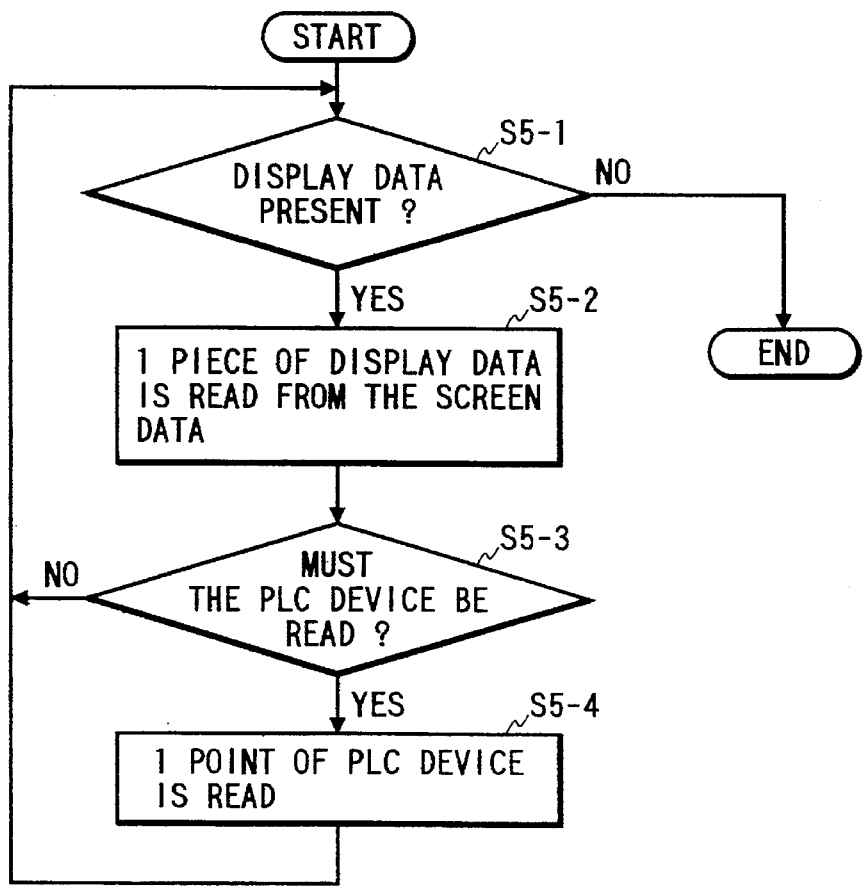
FIG. 55 is a diagram showing a screen of the monitor apparatus in which a conventional monitoring method is used.
FIG. 56 is a flowchart showing the operation of the conventional monitoring method.
Figure 57:
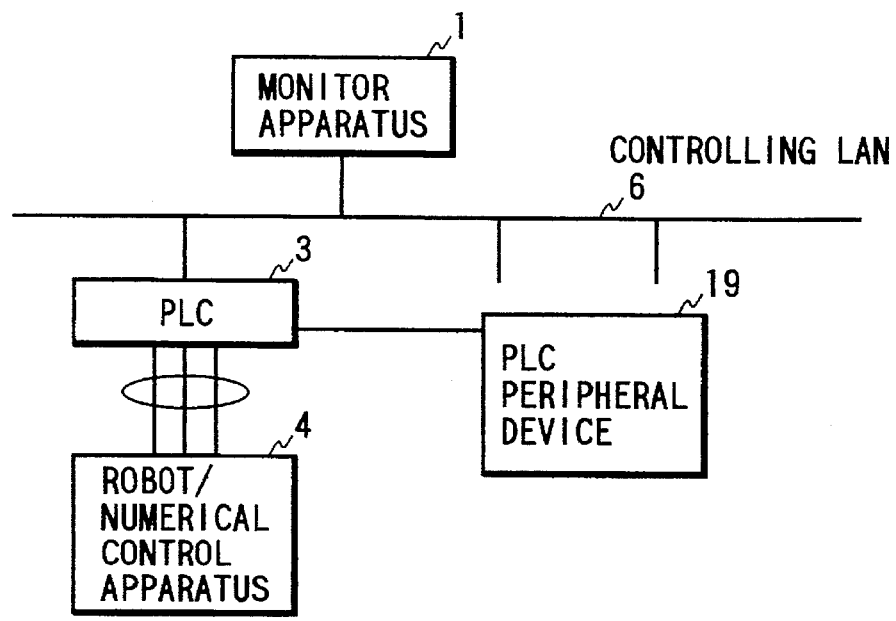
FIG. 57 is a system configuration diagram in which a monitor apparatus is used according to a conventional monitoring method.
Figure 59:
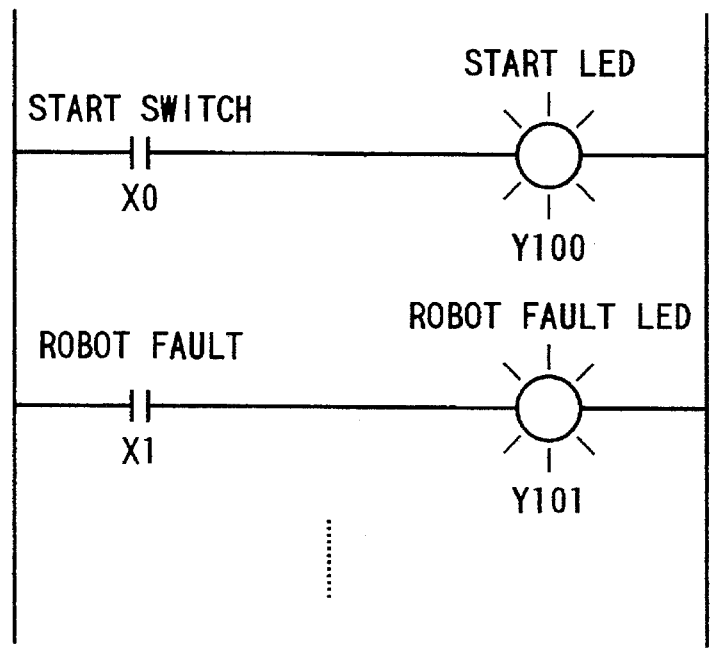
FIG. 59 is a diagram showing the sequence of the conventional PLC.
Figure 58:
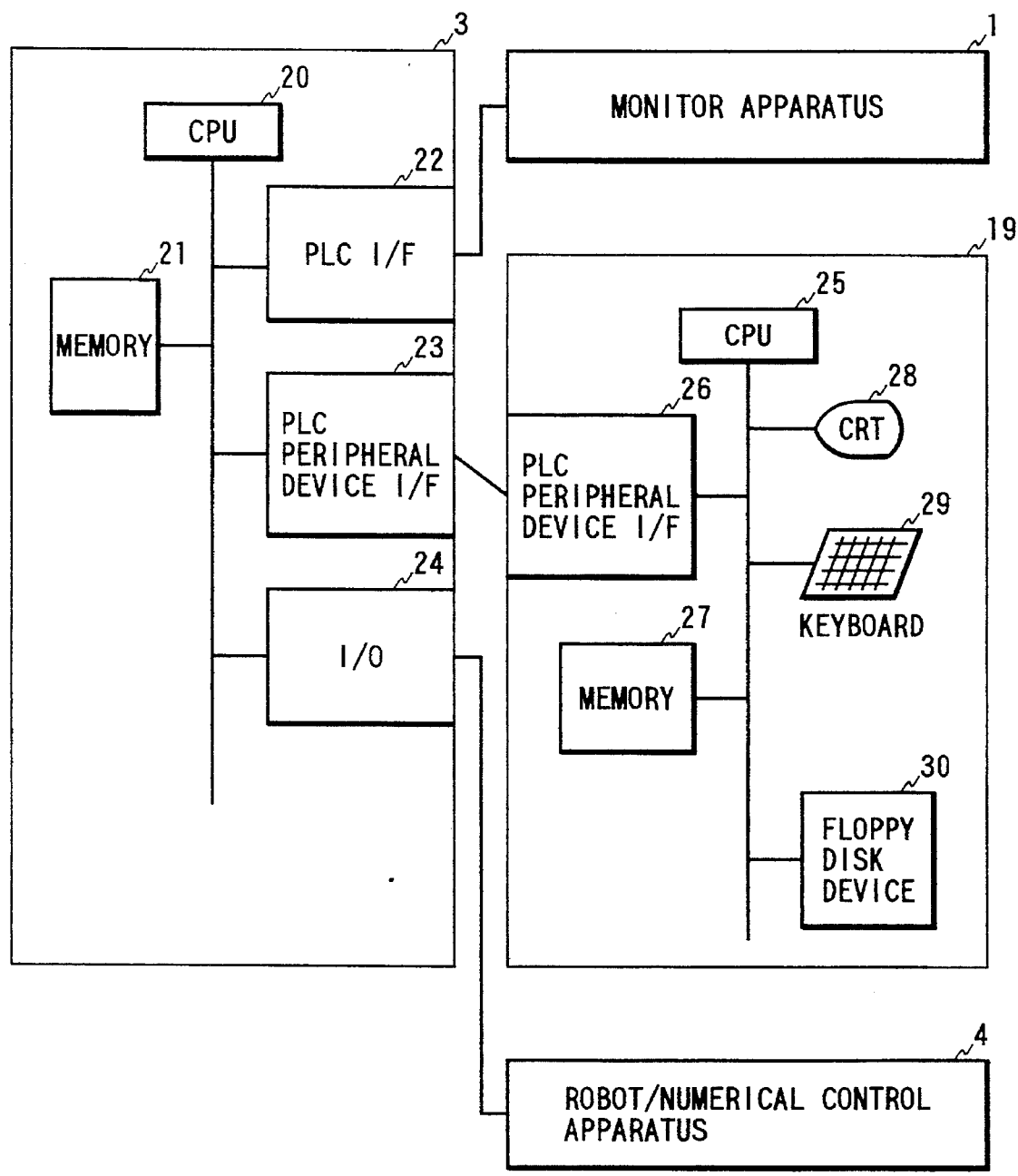
FIG. 58 is a block diagram showing the diagrammatic configuration of a PLC, a PLC peripheral device and a monitor apparatus in which a conventional monitoring method is used.
Figure 60:
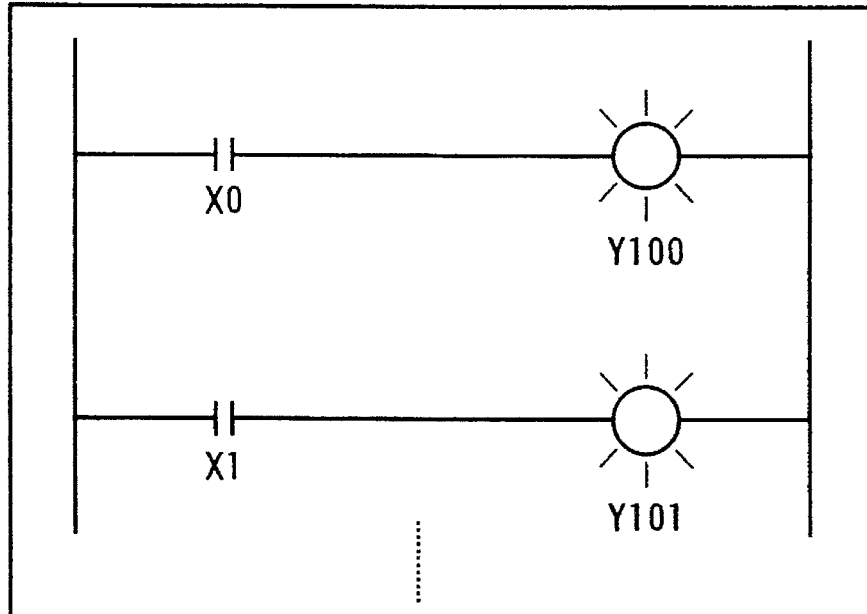
FIG. 60 is a diagram showing a conventional PLC sequence file.
Figure 61:
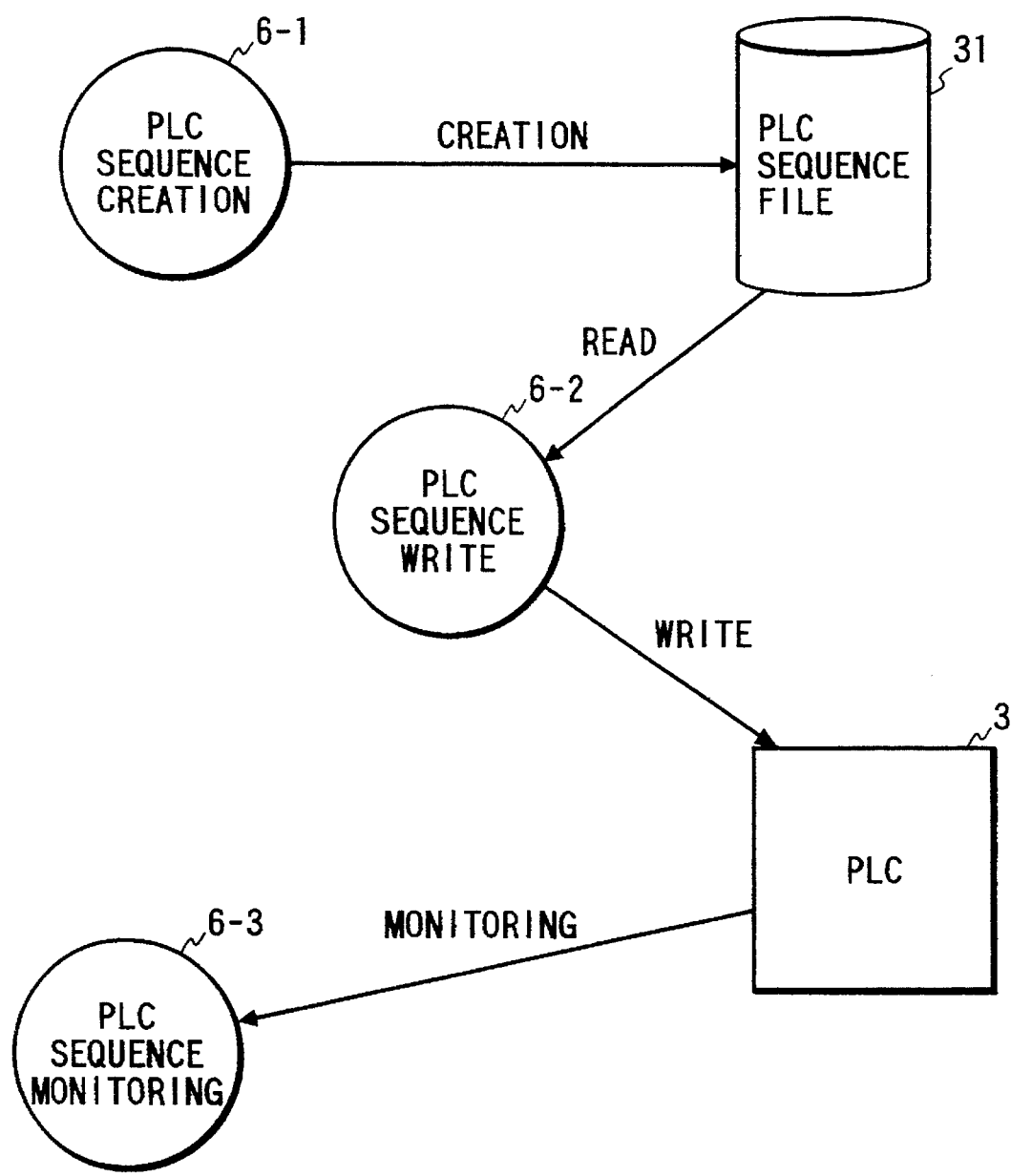
FIG. 61 is a functional diagram of the monitor apparatus in which a conventional monitoring method is used.
Figure 62:
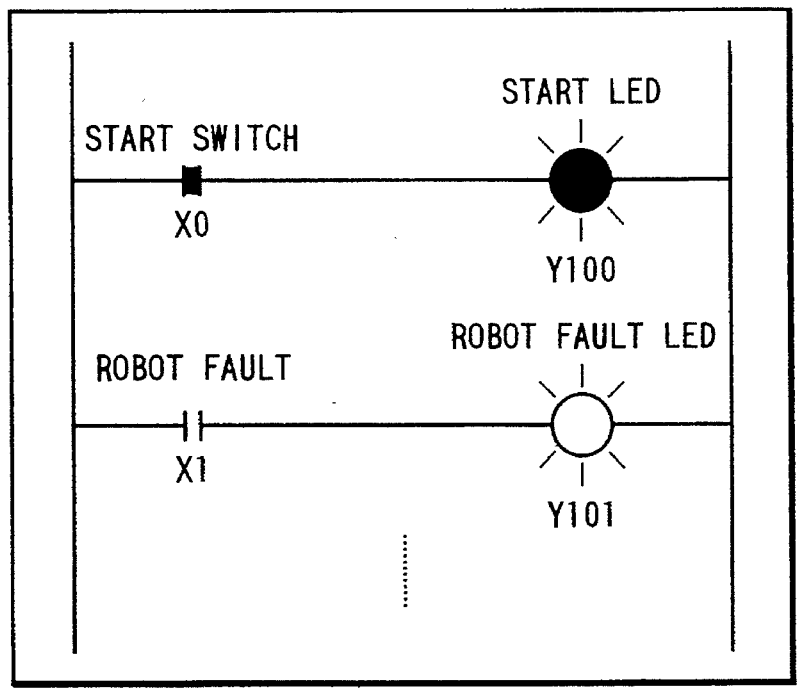
FIG. 62 is a diagram showing the screen of the conventional PLC peripheral device.
Figure 63:
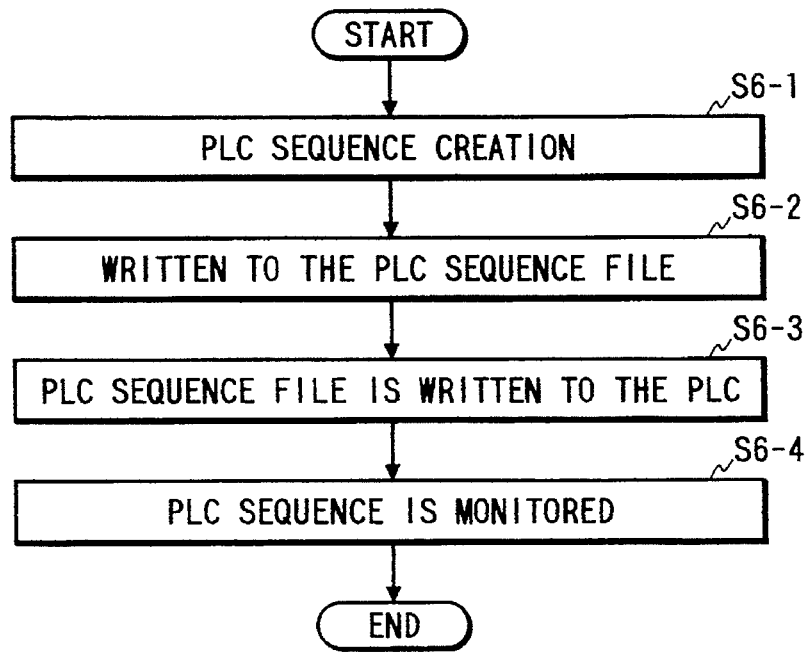
FIG. 63 is a flowchart showing the operation of a conventional monitoring method.

The PLC reading function 5-5 reads the three points beginning with D100 once, and then reads the six points beginning with D0 according to the device table, whereby the reading of all points of the PLC devices set in FIG. 54 is complete. The schedule function 5-4 and the PLC reading function 5-5 are constituted by the programs in the memory 15 and executed by the CPU 13.

Figure 23:
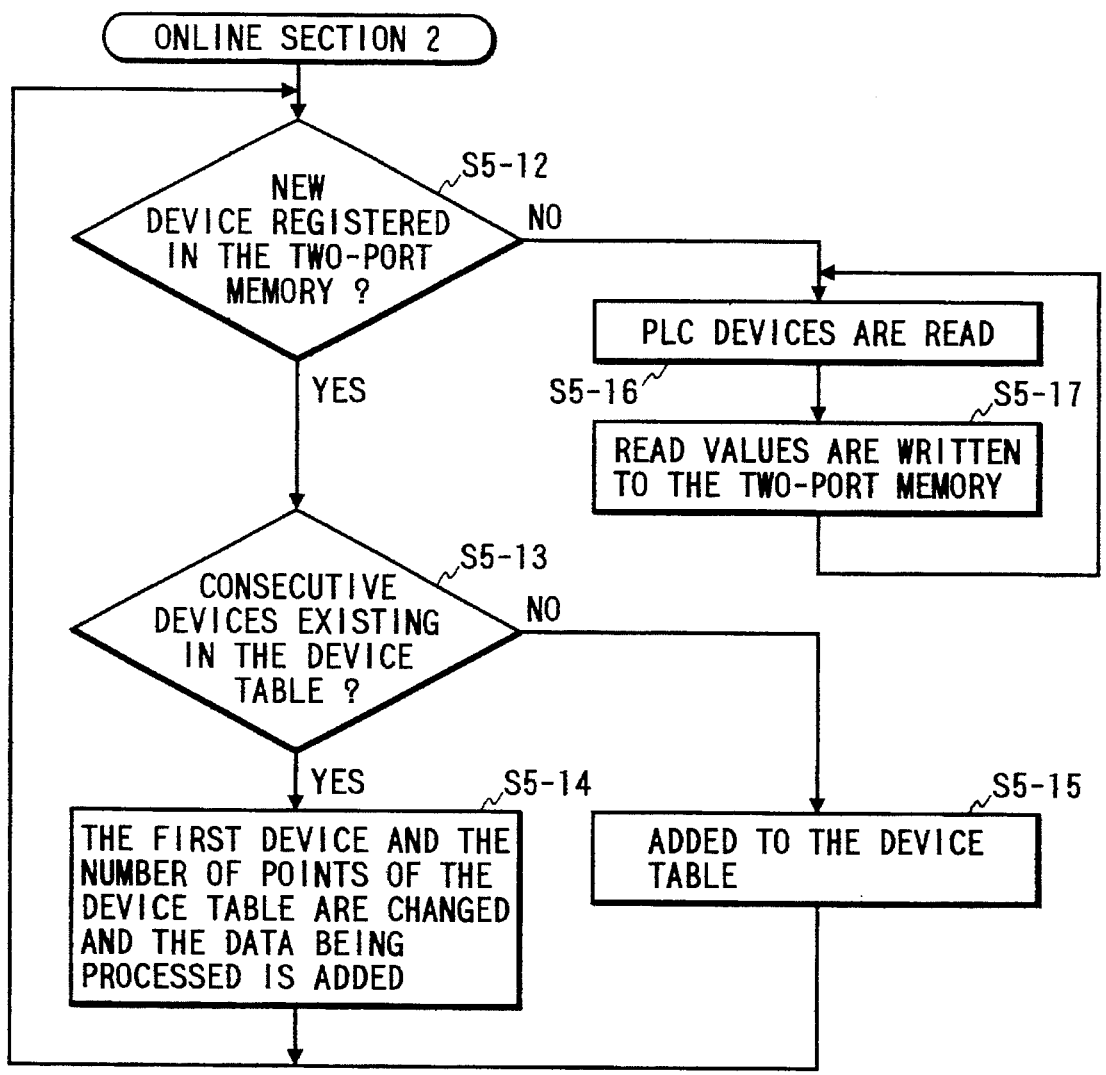
FIG. 23 is a flowchart showing the operation of the monitoring method according to the fifth embodiment of the present invention.

FIG. 23 is a flowchart showing the operations of the schedule function 5-4 and the PLC reading function 5-5 of the on-line section 2 in FIG. 22.

At step S5-12, it is confirmed that there is a new device registered in the device registration area of the two-port memory 16. After all the registration processing is over, the operation advances to step S5-16.

At step S5-13, it is checked whether or not there is registered in the device table of the memory 15 consecutive devices or devices falling within the range of six points that follow or are followed by the data of the device registration area 161. If such devices have not been registered, the new device is registered to the device table, and its number of points is set to "1" at step S5-15. If such devices had been registered, at step S5-14, the first device or the number of points in that device table is changed so that the new device falls within the range.

At step S5-16, the first device and the number of points are read from the device table of the memory 15, and the device values are read from the PLC 3 via the PLC interface 6. At step S5-17, the values read at step S5-16 are written to the device value range of the two-port memory 17 in the order of the devices in the device registration area of the two-port memory 16.

Steps S5-12, S5-13, S5-14 and S5-15 are implemented by the schedule function 5-4. Steps S5-16 and S5-17 are executed by the PLC reading function 5-5.

The fifth embodiment of the present invention achieves the following results. Specifically, the CPU 13 reads the PLC devices to reduce the load of the CPU 12. Also, consecutive PLC devices are put together in block by the schedule function 5-4. Hence, the number of times of that the devices are read from the PLC interface 6 is reduced, and the execution time of communication overhead decreases.

For example, when the PLC running the program of 10 ms running time with the screen data 5 in FIG. 54 is to be monitored on the assumption that the average communication overhead time is 5 ms (10 ms/2) and the performance of communication between the PLC interface 6 and the PLC 3 is 9600 bps, the read time of three points from D100 in the device table of FIG. 20 is as follows:

$$0.005+(3+6)*8/9600 \approx 12.5 ms$$

The number "3" in the parentheses of the above expression indicates the number of request data bytes and the number "6" indicates the number of response data bytes.

The read time of six points from D0 is as follows:

$$0.005+(3+12)*8/9600 \approx 17.5 \ ms$$

and the total read time is 30 ms. Since the total read time in the conventional example is 45.9 ms, that of the present embodiment is 15.9 ms shorter.

A sixth embodiment of the present invention will now be described.

Figure 26:
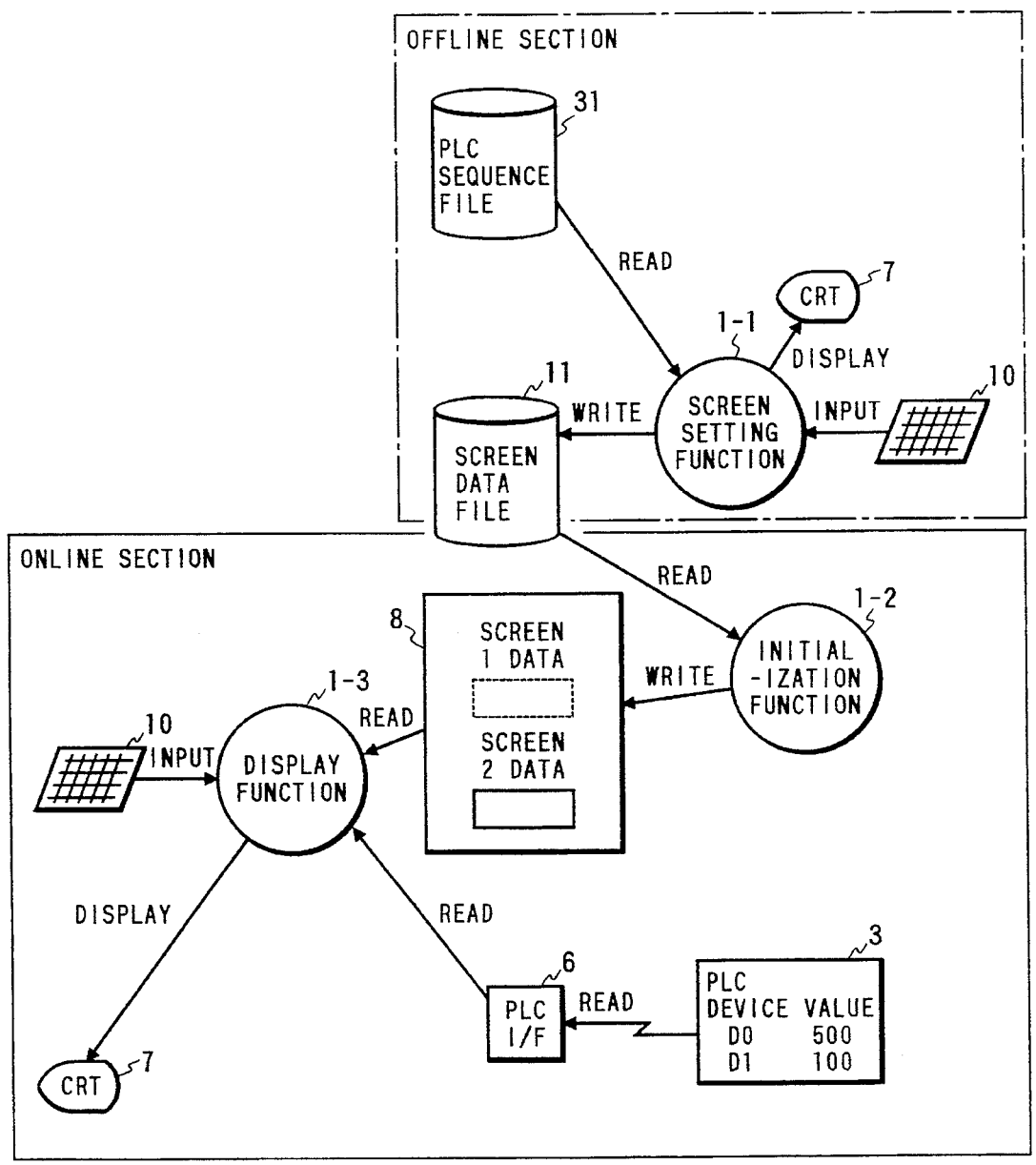
FIG. 26 is a functional diagram of a monitor apparatus in which a monitoring method according to a sixth embodiment of the present invention is used.

FIG. 26 is a block diagram showing the operation of the monitor apparatus in which the monitoring method of the sixth embodiment of the present invention is used. A screen setting function 1-1 reads comments from a PLC sequence file 21 and uses the comments to create a monitor screen on an interactive basis.

Figure 27:
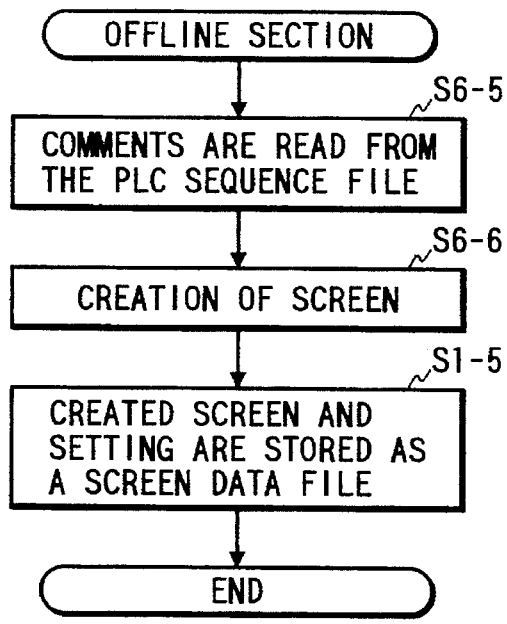
FIG. 27 is a flowchart showing the operation of the monitoring method according to the sixth embodiment of the present invention.

FIG. 27 is a flowchart showing the operation of the off-line section. At step S6-5, comments are read from the PLC sequence file 31 stored in the floppy disk of the floppy disk device (not shown).

At step S6-6, the comments read are used to create a monitor screen. At step S1-5, the screen is stored as a screen data file.

The operation of the on-line section can be performed in either of the conventional example and the present embodiment.

A seventh embodiment will now be described.

Figure 28:
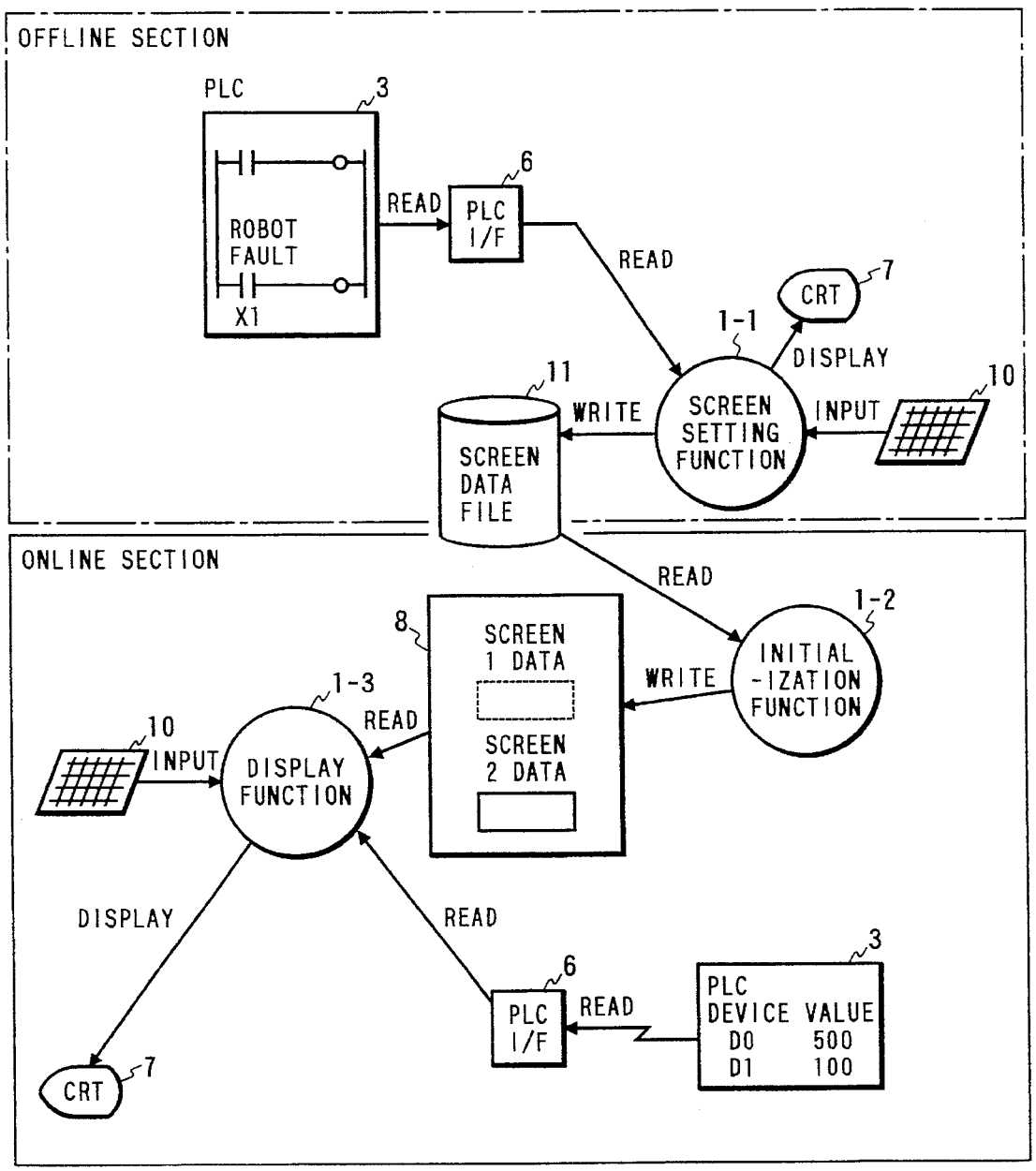
FIG. 28 is a functional diagram of a monitor apparatus in which the monitoring method according to a seventh embodiment of the present invention is used.
Figure 30:
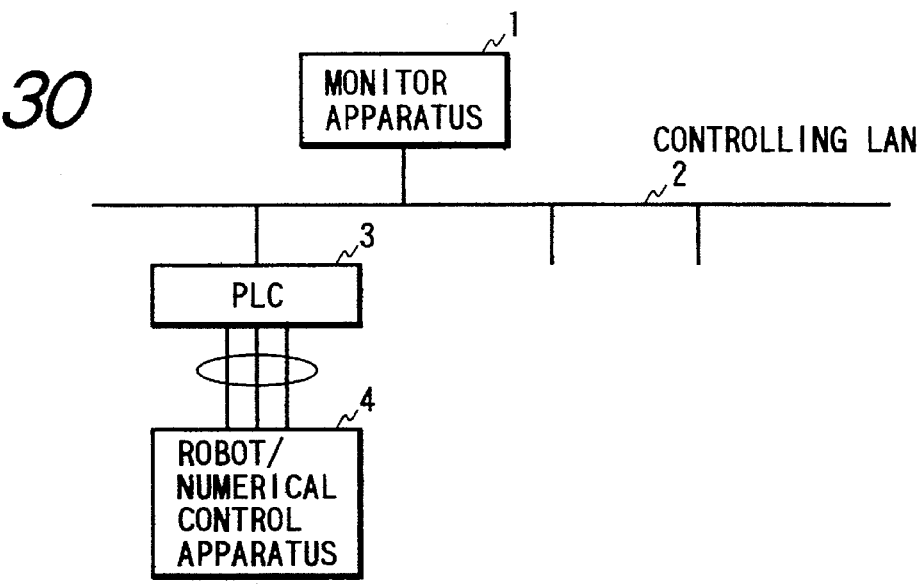
FIG. 30 is a system configuration diagram in which a monitor apparatus is used according to a conventional monitoring method.
Figure 31:
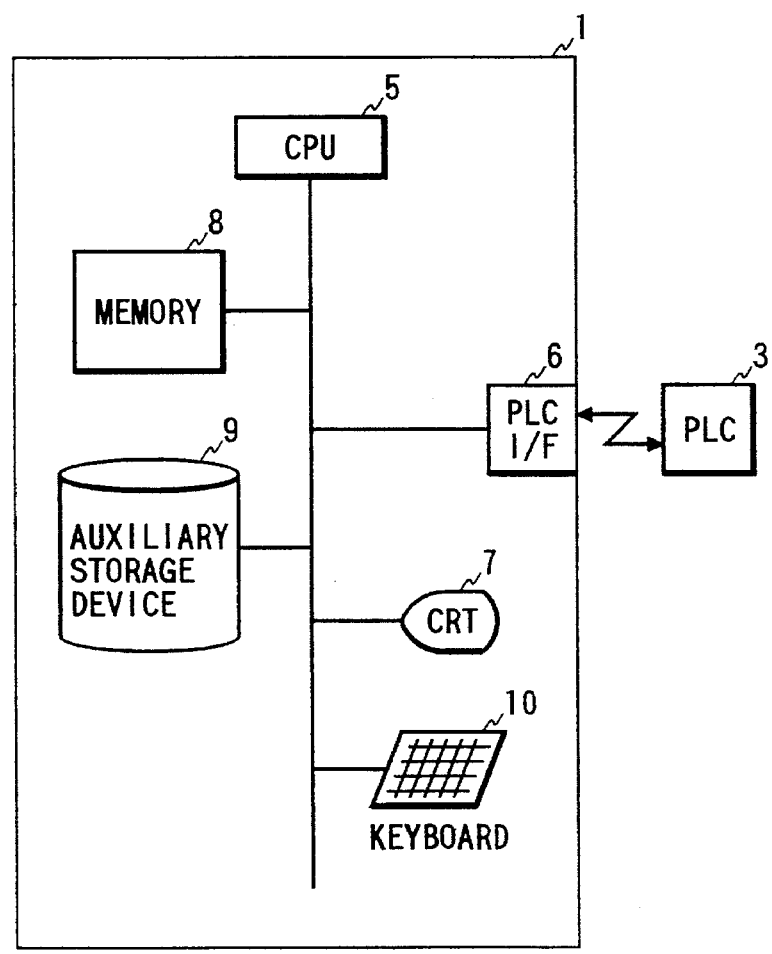
FIG. 31 is a block diagram showing the diagrammatic configuration of the monitor apparatus in which the conventional monitoring method is used.
Figure 34:
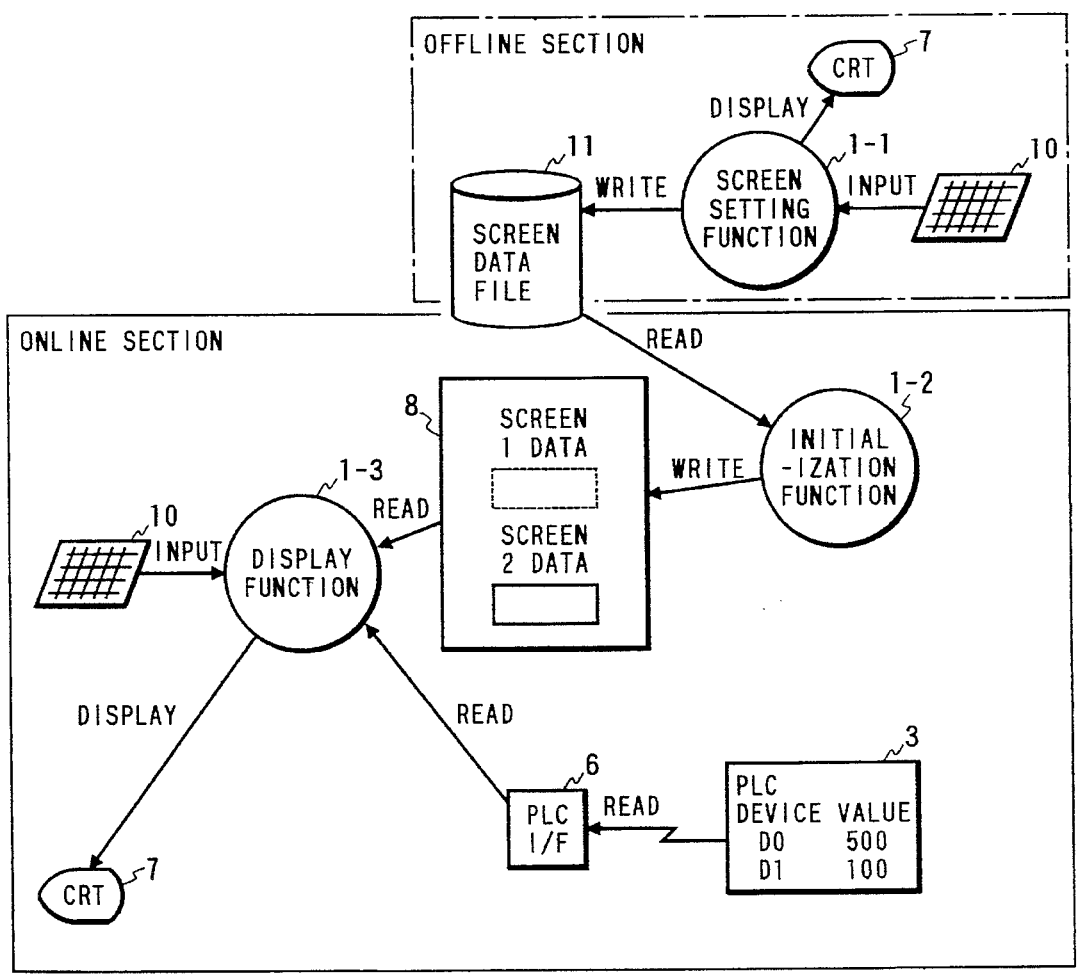
FIG. 34 is a functional diagram of the conventional monitor apparatus in which the conventional monitoring method is used.
Figure 36:
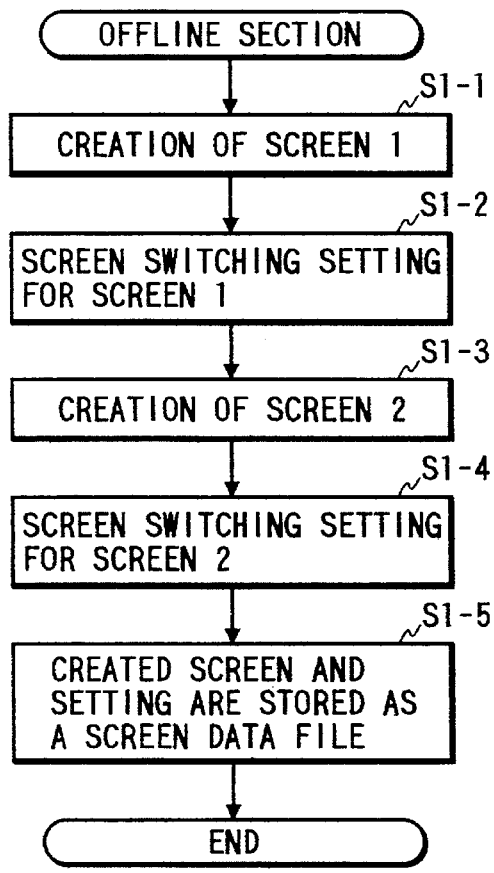
FIG. 36 is a flowchart showing the operation of the conventional monitoring method.

FIG. 28 is a block diagram showing the operation of the monitor apparatus in which the monitoring method of the seventh embodiment of the present invention is used. A screen setting function 1-1 reads comments from the PLC 3 via the PLC interface 6 and uses the comments to create a monitor screen on an interactive basis.

Figure 29:
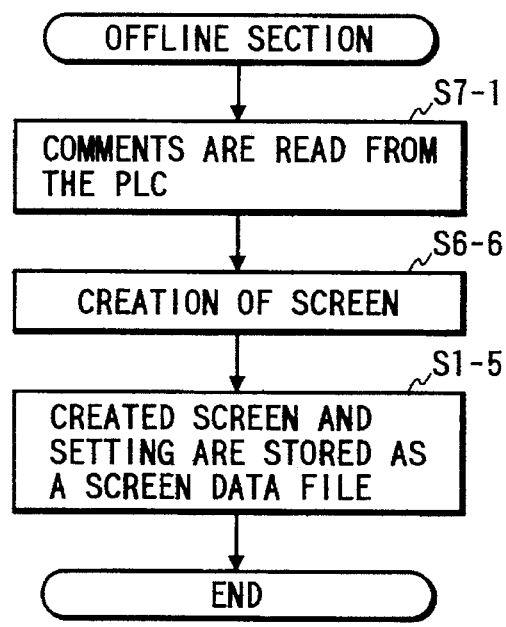
FIG. 29 is a flowchart showing the operation of the monitoring method according to the seventh embodiment of the present invention.

FIG. 29 is a flowchart showing the operation of the off-line section. At step S7-1, the comments of the PLC sequence stored in the PLC 3 are read from the PLC 3 via the PLC interface 6. At step S6-6, the comments read are used to create a monitor screen. At step S1-5, the created screen is stored as a data file.

The operation of the on-line section can be performed as in either the conventional example or the present embodiment.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A monitoring apparatus for use in a system having a device memory, in which information from input equipment which detects the state of an object to be controlled is stored, and a predetermined number of programmable controllers for controlling the object to be controlled by executing a given sequence program while referring to the contents of said device memory, said apparatus comprising:

a first processor which reads, from a first memory in which a predetermined number of screen data representing a screen display for displaying on a display unit are stored, a predetermined number of addresses of said device memory, which are described in said predetermined number of screen data, and writes said predetermined number of addresses to a two-port memory; and a second processor which sends each of said predetermined number of addresses written in said two-port memory to at least one of said programmable controllers, reads the contents at each of said addresses of said device memory from said at least one programmable controller, and writes, to said two-port memory, the contents read or a result obtained by performing predetermined calculations on the read contents;

said first processor further executes display processes for displaying a screen display on said display unit based on said predetermined number of screen data, reads, based on said predetermined number of screen data, parts of the contents written in said two-port memory by said second processor, which are necessary for screen display based on said predetermined number of screen data, and executes a display process to display the read parts of the contents; and said first and second processors perform their respective operations at the same time independently of each other.

2. A monitoring apparatus as claimed in claim 1, wherein said first processor further writes to a log file information based on the contents of said two-port memory written by said second processor.

3. A monitoring apparatus as claimed in claim 1, wherein said second processor further judges whether a series of addresses of said device memory exists, and if said series of addresses exists, sends a head address and the number of said addresses following said head address without sending said series of addresses to said programmable controller.

4. A monitoring apparatus as claimed in claim 1, further comprising an offline section which reads, from a sequence file in which information prepared by a peripheral device connected to said programmable controller is stored, a comment having said sequence file, prepares screen data by adding the read comment, and transfers a predetermined number of said screen data prepared to said first memory.

5. A monitoring apparatus for use in a system having a device memory in which information from input equipment which detects the state of an object to be controlled is stored, and a predetermined number of programmable controllers for controlling the object to be controlled by executing a sequence program while referring to the contents of said device memory, said apparatus comprising:

a first processor which reads, from a first memory in which a predetermined number of screen data representing a screen display for displaying on a display unit are stored, a predetermined number of addresses of said device memory representative of a predetermined number of devices to be trend-displayed, which are described in said predetermined number of screen data, and which writes said addresses read to a two-port memory; and a second processor which reads said predetermined number of addresses from said two-port memory, sends the read addresses to said programmable controller, reads the contents at the address in said device memory from said programmable controller, and writes, to said two-port memory, the read contents or a result obtained by performing predetermined calculations on the read contents; and said first processor further reads the contents of said two-port memory written by said second processor, and executes a display process so that values for said predetermined number of devices to be trend-displayed are displayed on said display unit on the basis of the read contents and so that a change of said predetermined number of devices to be trend-displayed is illustrated on said display unit in a cycle which is described in said screen data; and said second processor further reads the contents at said predetermined number of addresses from said device memory of said programmable controller, writes, to said two-port memory, the read contents or a result obtained by performing predetermined calculation on the read contents; and said first and second processors perform their respective operations at the same time independently of each other.

6. A monitoring apparatus as claimed in claim 5, wherein said first processor further writes to a log file information based on the contents of said two-port memory written by said second processor.

7. A monitoring apparatus as claimed in claim 5, wherein said second processor further judges whether a series of addresses of said device memory exists, and if said series of addresses exists, sends a head address and the number of said addresses following said head address without sending said series of addresses to said programmable controller.

8. A monitoring apparatus as claimed in claim 5, further comprising an offline section which reads, from a sequence file in which information prepared by a peripheral device connected to said programmable controller is stored, a comment having said sequence file, prepares screen data by adding the read comment, and transfers a predetermined number of said screen data prepared to said first memory.

9. A monitoring apparatus for use in a system having a device memory in which information from input equipment which detects the state of an object to be controlled is stored, and a predetermined number of programmable controllers for controlling the object to be controlled by executing a sequence program while referring to the contents of said device memory, said apparatus comprising:

a first processor which reads, from a first memory in which a predetermined number of screen data representing a screen display for displaying on a display unit are stored, addresses of said device memory, which are described in said screen data, writes the read addresses to a two-port memory, reads said addresses written in said two-port memory, stores, in a second memory, the read addresses every screen number at each of said addresses described in said predetermined number of screen data, and writes the screen numbers to said two-port memory; and a second processor which reads said screen numbers written in said two-port memory, reads each of said addresses for screen data having the read screen number from said second memory, sends the read addresses to said programmable controller, reads the contents of said device memory at said addresses from said programmable controller, and writes, to said two-port memory, the read contents or a result obtained by performing predetermined calculations on the read contents;

said first processor further reads the contents written by said second processor to said two-port memory and executes a display process so that the read contents is displayed on said display unit; and said first and second processors perform their respective operations at the same time independently of each other.

10. A monitoring apparatus as claimed in claim 9, wherein said second processor further judges whether a series of addresses of said device memory exists, and if said series of addresses exists, sends a head address and the number of said addresses following said head address without sending said series of addresses to said programmable controller.

11. A monitoring apparatus as claimed in claim 9, further comprising an offline section which reads, from a sequence file in which information prepared by a peripheral device connected to said programmable controller is stored, a comment having said sequence file, prepares screen data by adding the read comment, and transfers a predetermined number of said screen data prepared to said first memory.

12. A monitoring method in a system having a device memory in which information from input equipment which detects the state of an object to be controlled is stored, and a predetermined number of programmable controllers for controlling the object to be controlled by executing a sequence program while referring to the contents of said device memory, said method of comprising the steps of:

controlling a first processor to read, from a first memory in which a predetermined number of screen data representing a screen display for displaying on a display unit are stored, a predetermined number of addresses of said device memory, which are described in said predetermined number of screen data, and to write said predetermined number of addresses to a two-port memory;

controlling a second processor to send each of said predetermined number of addresses written in said two-port memory to said programmable controller, to read the contents at each of said addresses of said device memory from said programmable controller, and to write the contents read or a result obtained by preforming a predetermined calculation on the read contents to said two-port memory, while controlling said first processor to execute display processes for said display unit based on said predetermined number of screen data; and reading parts of the contents stored in said second-port memory, which are necessary for screen display based on said predetermined number of screen data, and executing a display process to display the read parts of the contents.

13. A monitoring method as claimed in claim 12, further comprising the step of controlling said second processor to judge whether a series of addresses of said device memory exists, and if said series of addresses exists, then controlling said second processor to send to said programmable controller a head address and the number of said addresses following said head address without sending said series of addresses.

14. A monitoring method as claimed in claim 12, further comprising the step of controlling said first processor to write information based on the contents of said two-port memory written by said second processor to a log file.

15. A monitoring method as claimed in claim 12, further comprising the step of controlling an offline section to read, from a sequence file in which information prepared by a peripheral device connected to said programmable controller is stored, a comment having said sequence file, to prepare screen data by adding the read comment, and to transfer said predetermined number of screen data prepared to said first memory.

16. A monitoring method in a system having a device memory in which information from input equipment which detects the state of an object to be controlled is stored, and a predetermined number of programmable controllers for controlling the object to be controlled by executing a sequence program while referring to the contents of said device memory, said method comprising the steps of:

controlling a first processor to read, from first memory in which a predetermined number of screen data representing a screen display for displaying on a display unit are stored, a predetermined number of addresses of said device memory representative of a predetermined number of devices to be trend-displayed, which are described in said predetermined number of screen data, and to write said addresses read to said two-port memory;

controlling a second processor to read said predetermined number of addresses from said two-port memory, to send the read addresses to said programmable controller, to read the contents at the address in said device memory from said programmable controller, and to write the read contents or a result obtained by preforming predetermined calculations on the read contents to said two-port memory, while controlling said first processor to execute parts of display processes for said display unit based on said predetermined number of screen data;

controlling said first processor to read the contents of said two-port memory written by said second processor, and to execute a display process so that values for said predetermined number of devices to be trend-displayed are displayed on said display means on the basis of the read contents; and controlling said second processor to read the contents at said predetermined number of addresses from said device memory of said programmable controller, to write the read contents or a result obtained by preforming a predetermined calculation on the read contents to said two-port memory, while controlling said first processor to read the contents of said two-port memory written by said second processor and to execute a display process so that a change of said predetermined number of devices to be trend-displayed is illustrated on said display unit in a cycle which is described in said screen data.

17. A monitoring method as claimed in claim 16, further comprising the step of controlling said first processor to write information based on the contents of said two-port memory written by said second processor to a log file.

18. A monitoring method as claimed in claim 16, further comprising the step of controlling said second processor to judge whether a series of addresses of said device memory exists, and if said series of addresses exists, then controlling said second processor to send to said programmable controller a head address and the number of said addresses following said head address without sending said series of addresses.

19. A monitoring method as claimed in claim 16, further comprising the step of controlling an offline section to read, from a sequence file in which information prepared by a peripheral device connected to said programmable controller is stored, a comment having said sequence file, to prepare screen data by adding the read comment, and to transfer said predetermined number of screen data prepared to said first memory.

20. A monitoring method in a system having a device memory in which information from input equipment which detects the state of an object to be controlled is stored, and a predetermined number of programmable controllers for controlling the object to be controlled by executing a given sequence program while referring to the contents of said device memory, said method of comprising the steps of:

controlling a first processor to read, from a first memory in which a predetermined number of screen data representing a screen display for displaying on a display unit are stored, addresses of said device memory, which are described in said screen data, and to write the read addresses to a two-port memory, while controlling a second processor to read said addresses written in said two-port memory and to store, in a second memory, the read addresses of every screen number at each of said addresses described in said predetermined number of screen data;

controlling said first processor to write the screen numbers to said two-port memory;

controlling the second processor to read said screen numbers written in said two-port memory, to read each of said addresses for screen data having the read screen number from said second memory means, to send the read addresses to said programmable controller, to read the contents of said device memory at said addresses from said programmable controller, and to write the read contents or a result obtained by performing a predetermined calculation on the read contents to said two-port memory, while controlling the first processor to execute display processes for said display unit on the basis of the screen data of said screen number; and controlling the first processor to read the contents written by said second processor to said two-port memory and to execute a display process so that the read contents is displayed on said display unit.

21. A monitoring method as claimed in claim 20, further comprising the step of controlling said second processor to judge whether a series of addresses of said device memory exists, and if said series of addresses exists, then controlling said second processor to send to said programmable controller a head address and the number of said addresses following said head address without sending said series of addresses.

22. A monitoring method as claimed in claim 20, further comprising the step of controlling an offline section to read, from a sequence file in which information prepared by a peripheral device connected to said programmable controller is stored, a comment having said sequence file, to prepare screen data by adding the read comment, and to transfer said predetermined number of screen data prepared to said first memory.

* * * * *